US009525648B2

United States Patent
Song et al.

(10) Patent No.: US 9,525,648 B2
(45) Date of Patent: Dec. 20, 2016

(54) METHOD FOR ACQUIRING PHYSICAL ADDRESS OF VIRTUAL MACHINE

(71) Applicant: Huawei Technologies Co., Ltd., Shenzhen (CN)

(72) Inventors: Yu Song, Shenzhen (CN); Zhiqiang Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/192,341

(22) Filed: Jun. 24, 2016

(65) Prior Publication Data

US 2016/0330143 A1    Nov. 10, 2016

Related U.S. Application Data

(63) Continuation of application No. PCT/CN2014/084594, filed on Aug. 18, 2014.

(30) Foreign Application Priority Data

Dec. 26, 2013 (CN) .......................... 2013 1 0733845

(51) Int. Cl.
*H04L 1/00* (2006.01)
*H04L 12/26* (2006.01)
(Continued)

(52) U.S. Cl.
CPC ........... *H04L 49/70* (2013.01); *H04L 12/4679* (2013.01); *H04L 45/42* (2013.01); *H04L 45/745* (2013.01); *H04W 40/24* (2013.01)

(58) Field of Classification Search
CPC ...... H04L 49/70; H04L 12/4679; H04L 45/42; H04L 45/745; H04W 40/24
See application file for complete search history.

(56) References Cited

U.S. PATENT DOCUMENTS

| 2013/0044754 | A1 | 2/2013 | Zhu | |
|---|---|---|---|---|
| 2013/0136126 | A1* | 5/2013 | Wang | H04L 61/103 370/392 |

(Continued)

FOREIGN PATENT DOCUMENTS

| CN | 101741702 A | 6/2010 |
|---|---|---|
| CN | 102055642 A | 5/2011 |

(Continued)

OTHER PUBLICATIONS

Partial English Translation and Abstract of Chinese Patent Application No. CN103731353, May 28, 2016, 4 pages.

(Continued)

*Primary Examiner* — Lonnie Sweet
(74) *Attorney, Agent, or Firm* — Conley Rose, P.C.

(57) ABSTRACT

A method for acquiring a physical address of a virtual machine includes acquiring, by a first switching endpoint, an address list of N switching endpoints from a centralized controller after receiving an address acquisition request sent by a first virtual machine, where the N switching endpoints include a second switching endpoint, sending, in a unicast manner according to the address list, the request to the N switching endpoints that include the second switching endpoint, and after receiving a second response sent by the second switching endpoint, sending the second response to the first virtual machine. The method may avoid the limitation on the quantity of created switching endpoints caused by the insufficient quantity of multicast groups of the switch in order to increase the quantity of created switching endpoints.

14 Claims, 9 Drawing Sheets

(51) Int. Cl.
*H04J 1/16* (2006.01)
*H04J 3/14* (2006.01)
*H04L 12/931* (2013.01)
*H04L 12/741* (2013.01)
*H04L 12/717* (2013.01)
*H04L 12/46* (2006.01)
*H04W 40/24* (2009.01)

(56) References Cited

U.S. PATENT DOCUMENTS

| | | | | |
|---|---|---|---|---|
| 2013/0232492 | A1* | 9/2013 | Wang | H04L 61/103 718/1 |
| 2014/0056299 | A1* | 2/2014 | Mitsunobu | H04L 45/74 370/389 |
| 2014/0064104 | A1* | 3/2014 | Nataraja | H04L 61/103 370/248 |
| 2014/0289560 | A1* | 9/2014 | Nishi | G06F 11/2221 714/31 |
| 2015/0030024 | A1* | 1/2015 | Venkataswami | H04L 45/74 370/392 |
| 2015/0043581 | A1* | 2/2015 | Devireddy | H04L 49/70 370/392 |
| 2015/0058968 | A1* | 2/2015 | Wang | H04L 63/0281 726/12 |
| 2015/0106804 | A1* | 4/2015 | Chandrashekhar | H04L 45/741 718/1 |
| 2015/0109923 | A1* | 4/2015 | Hwang | H04L 47/12 370/235 |
| 2015/0169351 | A1* | 6/2015 | Song | H04L 12/4641 718/1 |
| 2015/0172222 | A1* | 6/2015 | Liao | H04L 49/356 370/392 |
| 2016/0036620 | A1 | 2/2016 | Dunbar et al. | |

FOREIGN PATENT DOCUMENTS

| | | |
|---|---|---|
| CN | 102075591 A | 5/2011 |
| CN | 102123102 A | 7/2011 |
| CN | 102457586 A | 5/2012 |
| CN | 102577331 A | 7/2012 |
| CN | 103078957 A | 5/2013 |
| CN | 103731353 A | 4/2014 |
| EP | 1613023 A2 | 1/2006 |
| EP | 2362587 A1 | 8/2011 |

OTHER PUBLICATIONS

Foreign Communication From a Counterpart Application, Chinese Application No. 201310733845.7, Chinese Office Action dated Apr. 20, 2016, 7 pages.

Foreign Communication From a Counterpart Application, PCT Application No. PCT/CN2014/084594, English Translation of International Search Report dated Nov. 26, 2014, 2 pages.

Foreign Communication From a Counterpart Application, PCT Application No. PCT/CN2014/084594, English Translation of Written Opinion dated Nov. 26, 2014, 9 pages.

Mahalingam, M., et al., "VXLAN: A Framework for Overlaying Virtualized Layer 2 Network over Layer 3 Networks," draft-mahalingam-dutt-dcops-vxlan-06.txt, Nov. 5, 2013, 24 pages.

Zhang, T., et al., "Scalability and Bandwidth Optimization for Data Center Networks," IEEE 14th International conference on High Performance Computing and Communications, Jun. 2012, pp. 935-940.

Nakagawa, Y., et al., "A Management Method of IP Multicast in Overlay Networks using OpenFlow," HotSDN, Aug. 13, 2012, pp. 91-96.

Foreign Communication From a Counterpart Application, European Application No. 14873330.6, Extended European Search Report dated Oct. 17, 2016, 7 pages.

\* cited by examiner

METHOD FOR ACQUIRING PHYSICAL ADDRESS OF VIRTUAL MACHINE

CROSS-REFERENCE TO RELATED APPLICATIONS

This application is a continuation of International Application No. PCT/CN2014/084594, filed on Aug. 18, 2014, which claims priority to Chinese Patent Application No. 201310733845.7, filed on Dec. 26, 2013, both of which are hereby incorporated by reference in their entireties.

TECHNICAL FIELD

The present disclosure relates to the communications field, and in particular, to a method for acquiring a physical address of a virtual machine, a centralized controller, a switching endpoint, and a system.

BACKGROUND

With ongoing development of network technologies, virtual machines and virtual networks are applied more widely. To reduce operation costs of a data center and enhance virtual machine reliability, an operator needs to dynamically migrate virtual machines throughout the entire data center in a large scope instead of migrating virtual machines within a limited scope of a convergence or access switching endpoint. A traditional data center uses a layer 2 plus layer 3 networking architecture. If a virtual machine is migrated across layer 2, an Internet Protocol (IP) address of the virtual machine needs to be changed. Dynamic change of the IP address of the virtual machine may lead to interruption of an existing service connection, and affect normal service running. For example, a virtual machine VM 1 and a virtual machine VM 2 belong to a same virtual local area network but belong to different switching endpoints (or switching nodes such as a virtual tunnel endpoint (VTEP) device). To communicate with the virtual machine VM 2, the virtual machine VM 1 needs to know an IP address and a media access control (MAC) address of the virtual machine VM 2. However, if the virtual machine VM 2 is migrated across layer 2, the virtual machine VM 1 is unable to know the IP address and the MAC address of the virtual machine VM 2. Consequently, the virtual machine VM 1 and the virtual machine VM 2 cannot be normally connected.

In the prior art, when an IP address of a virtual machine changes dynamically, a virtual local area network learns a MAC address of the virtual machine in a multicast manner to ensure normal communication. For example, a switch to which the VM 1 belongs and a switch to which the VM 2 belongs are located in a same virtual local area network. When the virtual machine VM 1 needs to acquire an address of the virtual machine VM 2, the VM 1 sends an address acquisition request to the switch to which the VM 1 belongs. After receiving the address acquisition request, the switch to which the VM 1 belongs sends, in the multicast manner, the address acquisition request to all switches that are located in the same virtual local area network as the switch to which the VM 1 belongs. After receiving the address acquisition request, the switch to which the VM 2 belongs sends the address acquisition request to the VM 2. After receiving the address acquisition request, the VM 2 sends a response to the switch to which the VM 1 belongs via the switch to which the VM 2 belongs, where the response includes the address of the VM 2. The switch to which the VM 1 belongs sends the response to the VM 1 such that the VM 1 receives the response and acquires the address of the VM 2.

However, an existing switch can support up to 16 million (M) virtual machines in standard, and therefore, the switch needs to support 16 M multicast groups in theory. However, an existing physical switch supports a relatively small quantity of multicast groups, which is generally 500-2000 multicast groups, which leads to a limitation on a quantity of created switches due to an insufficient quantity of multicast groups of the switch. For example, when the switch to which the VM 1 belongs sends, in the multicast manner, the address acquisition request to all switches that are located in the same virtual local area network as the VM 1, if the switch to which the VM 1 belongs supports 100 multicast groups, a quantity of switches located in the same virtual local area network as the VM 1 is necessarily less than or equal to 100, which may lead to a limitation on the quantity of switches due to a relatively small quantity of multicast groups supported by the switch to which the VM 1 belongs.

SUMMARY

Embodiments of the present disclosure provide a method for acquiring an address of a virtual machine, a switching endpoint, a centralized controller, and a system, with a view to avoiding a limitation on a quantity of created switching endpoints caused by an insufficient quantity of multicast groups of a switch when an address of another virtual machine in a same virtual local area network is acquired in a multicast manner.

A first aspect of the embodiments of the present disclosure provides a method for acquiring a physical address of a virtual machine, including receiving, by a first switching endpoint to which a first virtual machine belongs, an address acquisition request sent by the first virtual machine, where the address acquisition request includes an IP address of a second virtual machine, sending, by the first switching endpoint, the address acquisition request to a centralized controller of a virtual local area network, where the address acquisition request carries an identifier of the virtual local area network in which the first virtual machine is located, receiving, by the first switching endpoint, a first response sent by the centralized controller in response to the address acquisition request, where the first response includes an address list of N switching endpoints that include a second switching endpoint, N is a positive integer, and the N switching endpoints are switching endpoints that belong to the virtual local area network, sending, by the first switching endpoint in a unicast manner according to the first response, the address acquisition request separately to the N switching endpoints that include the second switching endpoint, receiving, by the first switching endpoint, a second response in response to the address acquisition request, where the second response is sent by the second switching endpoint to which the second virtual machine belongs, and the second response includes a physical address of the second virtual machine, and sending, by the first switching endpoint, the second response to the first virtual machine.

With reference to the first aspect of the embodiments of the present disclosure, in a first implementation manner of the first aspect of the embodiments of the present disclosure, the method further includes determining, after the first switching endpoint receives the first response sent by the centralized controller in response to the address acquisition request, whether the first response indicates that the physical address of the second virtual machine is not stored in the centralized controller, and if the first response indicates that the physical address of the second virtual machine is not stored in the centralized controller, performing the step of sending, by the first switching endpoint in a unicast manner according to the first response, the address acquisition request separately to the N switching endpoints that include the second switching endpoint.

With reference to the first aspect of the embodiments of the present disclosure, in a second implementation manner of the first aspect of the embodiments of the present disclosure, receiving, by the first switching endpoint, a second response in response to the address acquisition request further includes receiving, by the first switching endpoint, the second response from the second switching endpoint, and/or, receiving, by the first switching endpoint, the second response from the centralized controller, where the second response is sent by the second switching endpoint to the centralized controller.

With reference to the first aspect of the embodiments of the present disclosure or the second implementation manner of the first aspect, in a third implementation manner of the first aspect of the embodiments of the present disclosure, the method further includes sending, by the first switching endpoint, a correspondence between the physical address and the IP address of the second virtual machine to the centralized controller such that the centralized controller stores the correspondence.

A second aspect of the embodiments of the present disclosure provides a method for acquiring a physical address of a virtual machine, which is used for a first virtual machine to acquire a physical address of a second virtual machine and includes receiving, by a centralized controller of a virtual local area network, an address acquisition request sent by a first switching endpoint to which the first virtual machine belongs, where the address acquisition request is sent by the first virtual machine in a broadcast manner, the address acquisition request is used to request to acquire the physical address of the second virtual machine, and the address acquisition request carries an IP address of the second virtual machine and an identifier of the virtual local area network in which the first virtual machine is located, determining, by the centralized controller according to the identifier of the virtual local area network, an address list of N switching endpoints that include a second switching endpoint, where N is a positive integer, and the N switching endpoints are switching endpoints that belong to the virtual local area network, and sending, by the centralized controller, a first response in response to the address acquisition request to the first switching endpoint, where the first response includes the address list, and the first response is used to instruct the first switching endpoint to send, in a unicast manner, the address acquisition request separately to the N switching endpoints that include the second switching endpoint.

With reference to the second aspect of the embodiments of the present disclosure, in a first implementation manner of the second aspect of the embodiments of the present disclosure, before sending, by the centralized controller, a first response in response to the address acquisition request to the first switching endpoint, the method further includes determining, by the centralized controller, whether the physical address of the second virtual machine is stored in the centralized controller, and if no, performing the step of sending, by the centralized controller, a first response in response to the address acquisition request to the first switching endpoint.

With reference to the second aspect of the embodiments of the present disclosure, in a second implementation manner of the second aspect of the embodiments of the present disclosure, the method further includes acquiring, by the centralized controller, a correspondence between the physical address of the second virtual machine and the IP address of the second virtual machine, and storing the correspondence.

A third aspect of the present disclosure provides a switching endpoint, which is used for a first virtual machine to acquire a physical address of a second virtual machine and includes a first receiving unit configured to receive an address acquisition request sent by the first virtual machine, where the address acquisition request carries an IP address of the second virtual machine, a first sending unit configured to send the address acquisition request to a centralized controller of a virtual local area network, a second receiving unit configured to receive a first response sent by the centralized controller in response to the address acquisition request, where the first response includes an address list of N switching endpoints that include a second switching endpoint, N is a positive integer, and the N switching endpoints are switching endpoints that belong to the virtual local area network, a second sending unit configured to send, in a unicast manner according to the first response, the address acquisition request separately to the N switching endpoints that comprise the second switching endpoint, a third receiving unit configured to receive a second response in response to the address acquisition request, where the second response is sent by the second switching endpoint to which the second virtual machine belongs, and the second response includes the physical address of the second virtual machine, and a third sending unit configured to send the second response to the first virtual machine.

With reference to the third aspect of the embodiments of the present disclosure, in a first implementation manner of the third aspect of the embodiments of the present disclosure, the switching endpoint further includes a first judging unit configured to determine whether the physical address of the second virtual machine is not stored in the centralized controller as indicated by the first response, and a first determining unit configured to trigger the second sending unit to perform sending, in a unicast manner according to the first response, the address acquisition request separately to the N switching endpoints that comprise the second switching endpoint if the physical address of the second virtual machine is not stored in the centralized controller.

With reference to the third aspect of the embodiments of the present disclosure, in a second implementation manner of the third aspect of the embodiments of the present disclosure, the third receiving unit includes a first receiving subunit configured to receive the second response from the second switching endpoint, and/or, a second receiving subunit configured to receive the second response from the centralized controller, where the second response is sent by the second switching endpoint to the centralized controller.

With reference to the third aspect of the embodiments of the present disclosure, in a third implementation manner of the third aspect of the embodiments of the present disclosure, the switching endpoint further includes a fourth sending unit configured to send a correspondence between the physical address and the IP address of the second virtual machine to the centralized controller such that the centralized controller stores the correspondence.

A fourth aspect of the embodiments of the present disclosure provides a centralized controller, including a fourth receiving unit configured to receive an address acquisition request sent by a first switching endpoint to which a first virtual machine belongs, where the address acquisition request is sent by the first virtual machine in a broadcast manner, the address acquisition request is used to request a physical address of a second virtual machine, and the address acquisition request carries an IP address of the second virtual machine and an identifier of a virtual local area network in which the first virtual machine is located, a second determining unit configured to determine, according to the identifier of the virtual local area network, an address list of N switching endpoints that include a second switching endpoint, where N is a positive integer, and the N switching endpoints are switching endpoints that belong to the virtual local area network, and a fifth sending unit configured to send a first response in response to the address acquisition request to the first switching endpoint, where the first response includes the address list, and the first response is used to instruct the first switching endpoint to send, in a unicast manner, the address acquisition request separately to the N switching endpoints that include the second switching endpoint such that the first switching endpoint can receive a second response that is sent by the second switching endpoint and includes the physical address of the second virtual machine, and such that the first switching endpoint sends the received second response to the first virtual machine.

With reference to the fourth aspect of the embodiments of the present disclosure, in a first implementation manner of the fourth aspect of the embodiments of the present disclosure, the centralized controller further includes a second judging unit configured to determine whether the physical address of the second virtual machine is stored in the centralized controller, and a third determining unit configured to determine that the physical address of the second virtual machine is not stored in the centralized controller, and trigger the fifth sending unit to send the first response in response to the address acquisition request to the first switching endpoint.

With reference to the fourth aspect of the embodiments of the present disclosure, in a second implementation manner of the fourth aspect of the embodiments of the present disclosure, the centralized controller further includes a storing unit configured to acquire a correspondence between the physical address of the second virtual machine and the IP address of the second virtual machine, and store the correspondence.

A fifth aspect of the embodiments of the present disclosure provides a communications system, including a first switching endpoint, a centralized controller, and a second switching endpoint, where the first switching endpoint is configured to receive an address acquisition request sent by a first virtual machine, where the address acquisition request carries an IP address of a second virtual machine and is used to request a physical address of the second virtual machine, and send the address acquisition request to a centralized controller of a virtual local area network, where the address acquisition request carries an identifier of the virtual local area network in which the first virtual machine is located. The centralized controller is configured to receive the address acquisition request sent by the first switching endpoint, determine, according to the identifier of the virtual local area network, an address list of N switching endpoints that include the second switching endpoint, and send a first response in response to the address acquisition request to the first switching endpoint. The first switching endpoint is further configured to receive the first response, where the first response includes the address list of the N switching endpoints that include the second switching endpoint, N is a positive integer, and the N switching endpoints are switching endpoints that belong to the virtual local area network, and send, in a unicast manner according to the first response, the address acquisition request separately to the N switching endpoints that comprise the second switching endpoint. The second switching endpoint is configured to receive the address acquisition request sent by the first switching endpoint in the unicast manner, send the address acquisition request to the second virtual machine, receive a second response sent by the second virtual machine, and send the second response. The first switching endpoint is further configured to receive the second response, where the second response includes the physical address of the second virtual machine, and send the second response to the first virtual machine.

From the foregoing technical solutions, it can be seen that the embodiments of the present disclosure have the following advantages.

In the embodiments of the present disclosure, a first switching endpoint to which a first virtual machine belongs receives an address acquisition request sent by the first virtual machine, where the address acquisition request includes an IP address of a second virtual machine and is used to request a physical address of the second virtual machine, the first virtual machine and the first switching endpoint belong to a same virtual local area subnet, the second virtual machine and a second switching endpoint belong to a same virtual local area subnet, and the first switching endpoint and the second switching endpoint are located in a same virtual local area network and belong to different virtual local area subnets. The first switching endpoint sends the address acquisition request to a centralized controller in the virtual local area network, where the address acquisition request includes an identifier of a virtual local area network in which the first virtual machine is located. The first switching endpoint receives a first response sent by the centralized controller in response to the address acquisition request, where the first response includes an address list of N switching endpoints that include the second switching endpoint, N is a positive integer, and the N switching endpoints are different switching endpoints that belong to the virtual local area network. The first switching endpoint sends, in a unicast manner according to the first response, the address acquisition request separately to the N switching endpoints that include the second switching endpoint. The first switching endpoint receives a second response in response to the address acquisition request, where the second response is sent by the second switching endpoint to which the second virtual machine belongs, and the second response includes the physical address of the second virtual machine, and the first switching endpoint sends the second response to the first virtual machine. In this way, when the first switching endpoint sends, in the unicast manner, the address acquisition request to the N switching endpoints that include the second switching endpoint, a quantity of multicast groups of the first switching endpoint no longer imposes a limitation. Therefore, switching endpoints that can be created by the virtual local area network to which the first switching endpoint belongs are no longer limited by the quantity of multicast groups of the first switching endpoint, and a quantity of switching endpoints in the same virtual local area network can be increased.

DESCRIPTION OF EMBODIMENTS

Embodiments of the present disclosure provide a method for acquiring a physical address of a virtual machine, a switching endpoint, a centralized controller, and a communications system, with a view to avoiding a limitation on a quantity of created switching endpoints caused by an insufficient quantity of multicast groups of a switch in order to increase the quantity of created switching endpoints.

To make persons skilled in the art understand the technical solutions in the present disclosure better, the following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Detailed description is given below.

In the specification, claims, and accompanying drawings of the present disclosure, the terms "first", "second", "third", "fourth", and so on are intended to distinguish between similar objects but do not necessarily indicate a specific order or sequence. It should be understood that the data termed in such a way is interchangeable in proper circumstances such that the embodiments of the present disclosure described herein can, for example, be implemented in orders except the order illustrated or described herein.

Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
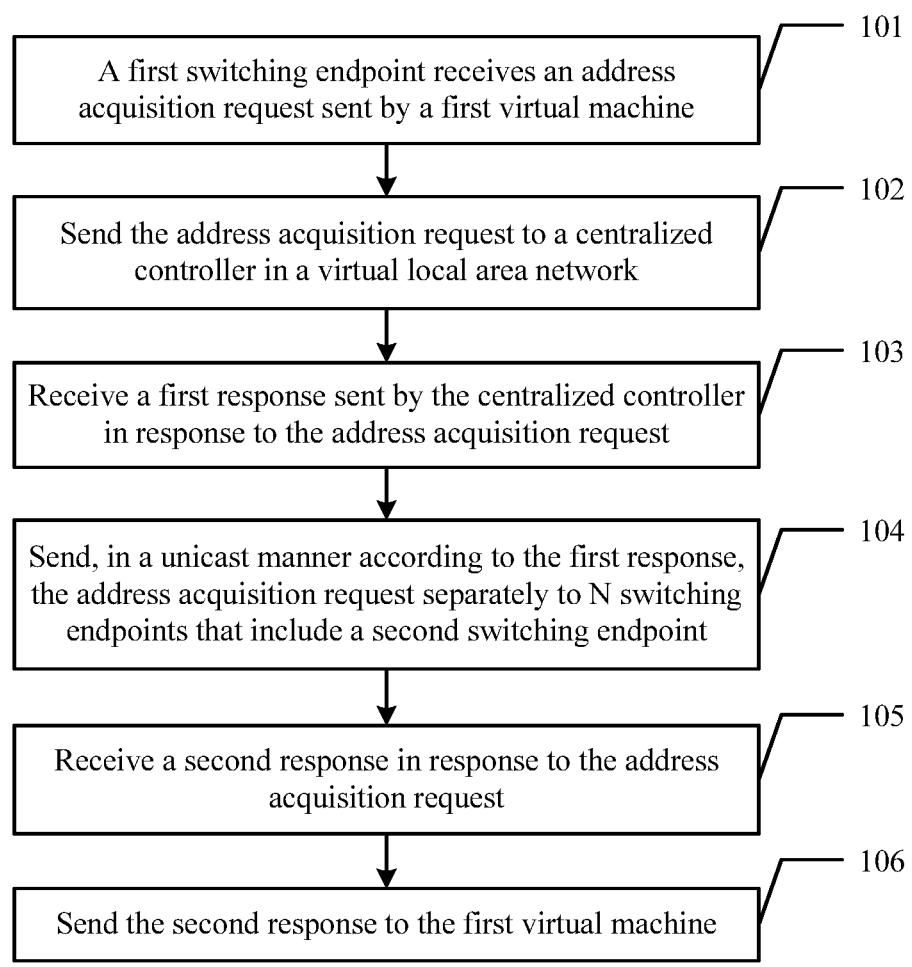
FIG. 1 is a schematic flowchart of an embodiment of a method for acquiring a physical address of a virtual machine according to an embodiment of the present disclosure.

Referring to FIG. 1, FIG. 1 is a schematic flowchart of an embodiment of a method for acquiring a physical address of a virtual machine according to an embodiment of the present disclosure. As shown in FIG. 1, the method for acquiring a physical address of a virtual machine according to this embodiment of the present disclosure may include the following steps.

Step 101: A first switching endpoint receives an address acquisition request sent by a first virtual machine.

In a same virtual local area network, one centralized controller may manage multiple switching endpoints, and each switching endpoint may also manage multiple virtual machines. A switching endpoint and virtual machines managed by the switching endpoint form a virtual local area subnet. The centralized controller, the switching endpoints managed by the centralized controller, and virtual machines managed by the switching endpoints form a virtual local area network.

When the first virtual machine needs to acquire an address of a second virtual machine, the first virtual machine may send an address acquisition request to the first switching endpoint in a broadcast manner to request to acquire a physical address of the second virtual machine. The first switching endpoint receives the request.

It should be noted that the first switching endpoint and the first virtual machine are located in a same virtual local area subnet, and the first virtual machine and the second virtual machine are located in a same virtual local area network and belong to different virtual local area subnets.

It should be noted that the address acquisition request may include an IP address of the second virtual machine.

Understandably, the switching endpoint may be a physical switch, or may be a virtual tunnel endpoint device, which is not limited herein.

Step 102: Send the address acquisition request to a centralized controller of a virtual local area network.

After receiving the address acquisition request sent by the first virtual machine, the first switching endpoint reports the address acquisition request to a centralized controller of the virtual local area network to which the first switching endpoint belongs.

It should be noted that when sending the address acquisition request to the centralized controller, the first switching endpoint may use the address acquisition request to carry an identifier of the virtual local area network to which the first switching endpoint belongs.

Step 103: Receive a first response sent by the centralized controller in response to the address acquisition request.

After the first switching endpoint sends the address acquisition request to the centralized controller, the centralized controller receives the address acquisition request and sends the first response to the first switching endpoint. The first switching endpoint receives the first response.

It should be noted that the first response includes an address list, where the address list is an address list of N switching endpoints that include a second switching endpoint, N indicates a positive integer, and the N switching endpoints are different switching endpoints in the virtual local area network to which the first switching endpoint belongs. The first switching endpoint may acquire, from the first response, the address list of the N switching endpoints that include the second switching endpoint after receiving the first response.

Understandably, N is less than or equal to a quantity of all switching endpoints in the virtual local area network.

Step 104: Send, in a unicast manner according to the first response, the address acquisition request separately to N switching endpoints that include a second switching endpoint.

After acquiring, from the first response sent by the centralized controller, the address list of the N switching endpoints that include the second switching endpoint, the first switching endpoint may send, in the unicast manner according to the address list, the address acquisition request separately to the N switching endpoints that include the second switching endpoint.

Understandably, the address acquisition request sent by the first switching endpoint to the N switching endpoints that include the second switching endpoint may carry the identifier of the virtual local area network.

Step 105: Receive a second response in response to the address acquisition request.

After the first switching endpoint sends the address acquisition request to the N switching endpoints that include the second switching endpoint, the second switching endpoint receives the address acquisition request, the second switching endpoint sends the second response in response to the address acquisition request, and the first switching endpoint receives the second response.

It should be noted that the second response includes the physical address of the second virtual machine.

Step 106: Send the second response to the first virtual machine.

The first switching endpoint sends the second response to the first virtual machine after receiving the second response. The first virtual machine may acquire the physical address of the second virtual machine from the second response.

In this embodiment of the present disclosure, a first switching endpoint to which a first virtual machine belongs receives an address acquisition request sent by the first virtual machine, where the address acquisition request includes an IP address of a second virtual machine and is used to request a physical address of the second virtual machine, the first virtual machine and the first switching endpoint belong to a same virtual local area subnet, the second virtual machine and a second switching endpoint belong to a same virtual local area subnet, and the first switching endpoint and the second switching endpoint are located in a same virtual local area network and belong to different virtual local area subnets. The first switching endpoint sends the address acquisition request to a centralized controller in the virtual local area network, where the address acquisition request includes an identifier of a virtual local area network in which the first virtual machine is located. The first switching endpoint receives a first response sent by the centralized controller in response to the address acquisition request, where the first response includes an address list of N switching endpoints that include the second switching endpoint, N is a positive integer, and the N switching endpoints are different switching endpoints that belong to the virtual local area network. The first switching endpoint sends, in a unicast manner according to the first response, the address acquisition request separately to the N switching endpoints that include the second switching endpoint. The first switching endpoint receives a second response in response to the address acquisition request, where the second response is sent by the second switching endpoint to which the second virtual machine belongs, and the second response includes the physical address of the second virtual machine, and the first switching endpoint sends the second response to the first virtual machine. In this way, when the first switching endpoint sends, in the unicast manner, the address acquisition request to the N switching endpoints that include the second switching endpoint, a quantity of multicast groups of the first switching endpoint no longer imposes a limitation. Therefore, switching endpoints that can be created by the virtual local area network to which the first switching endpoint belongs are no longer limited by the quantity of multicast groups of the first switching endpoint, and a quantity of switching endpoints in the same virtual local area network can be increased.

Figure 2:
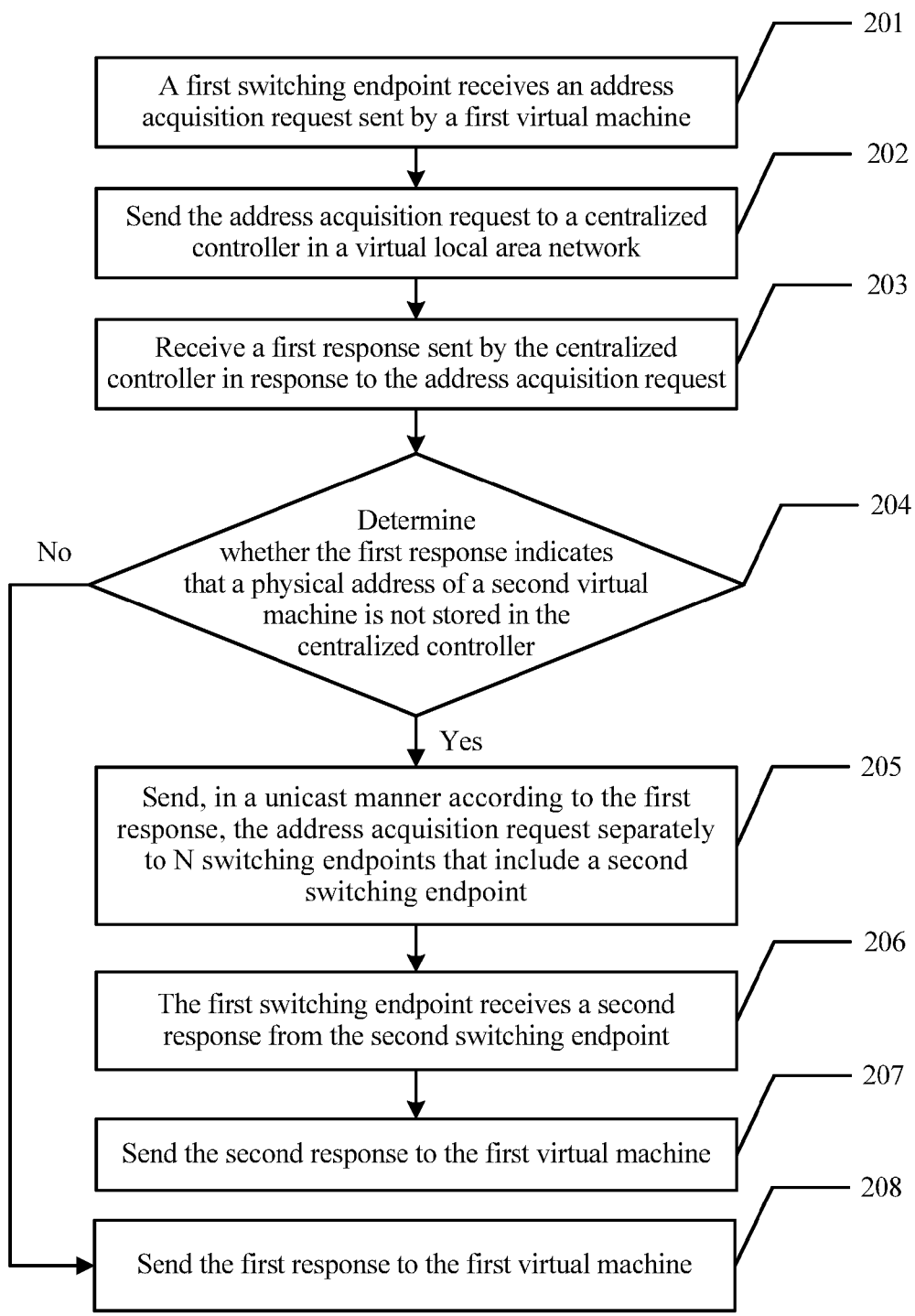
FIG. 2 is a schematic flowchart of another embodiment of a method for acquiring a physical address of a virtual machine according to an embodiment of the present disclosure.

In the embodiment shown in FIG. 1, the first switching endpoint sends, in the unicast manner, the request to the N switching endpoints that include the second switching endpoint after receiving the address acquisition request sent by the first virtual machine. After receiving the second response that is sent by the second switching endpoint and includes the physical address of the second virtual machine, the first switching endpoint sends the second response to the first virtual machine such that the first virtual machine may acquire the physical address of the second virtual machine by means of the second response. In practical application, the physical address of the second virtual machine may be stored in the centralized controller in the virtual local area network to which the first switching endpoint belongs. After receiving the first response sent by the centralized controller, the first switching endpoint may make a judgment on the first response. The first switching endpoint may also receive, in multiple manners, the second response sent by the second switching endpoint, which is detailed below using a specific embodiment. Refer to FIG. 2. FIG. 2 is a schematic flowchart of another embodiment of a method for acquiring a physical address of a virtual machine according to an embodiment of the present disclosure. As shown in FIG. 2, the method for acquiring a physical address of a virtual machine according to this embodiment of the present disclosure may include the following steps.

Step 201: A first switching endpoint receives an address acquisition request sent by a first virtual machine.

In a same virtual local area network, one centralized controller may manage multiple switching endpoints, and each switching endpoint may also manage multiple virtual machines. A switching endpoint and virtual machines managed by the switching endpoint form a virtual local area subnet. The centralized controller, the switching endpoints managed by the centralized controller, and virtual machines managed by the switching endpoints form a virtual local area network.

The first virtual machine may send an address acquisition request to the first switching endpoint in a broadcast manner to request to acquire a physical address of the second virtual machine when the first virtual machine needs to acquire an address of a second virtual machine. The first switching endpoint receives the request.

It should be noted that the first switching endpoint and the first virtual machine are located in a same virtual local area subnet, and the first virtual machine and the second virtual machine are located in a same virtual local area network and belong to different virtual local area subnets.

It should be noted that the address acquisition request may include an IP address of the second virtual machine.

Understandably, the switching endpoint may be a physical switch, or may be a virtual tunnel endpoint device, which is not limited herein.

Step 202: Send the address acquisition request to a centralized controller of the virtual local area network.

After receiving the address acquisition request sent by the first virtual machine, the first switching endpoint reports the address acquisition request to a centralized controller of the virtual local area network to which the first switching endpoint belongs.

It should be noted that when sending the address acquisition request to the centralized controller, the first switching endpoint may include an identifier of the virtual local area network to which the first switching endpoint belongs in the address acquisition request.

Step 203: Receive a first response sent by the centralized controller in response to the address acquisition request.

After the first switching endpoint sends the address acquisition request to the centralized controller, the centralized controller receives the address acquisition request and sends the first response to the first switching endpoint. The first switching endpoint receives the first response.

It should be noted that the first response includes an address list, where the address list is an address list of N switching endpoints that include a second switching endpoint, N indicates a positive integer, and the N switching endpoints are different switching endpoints in the virtual local area network to which the first switching endpoint belongs. After receiving the first response, the first switching endpoint may acquire, from the first response, the address list of the N switching endpoints that include the second switching endpoint.

Understandably, N is less than or equal to a quantity of all switching endpoints in the virtual local area network.

Step 204: Determine whether the first response indicates that a physical address of a second virtual machine is not stored in the centralized controller. If the first response indicates that a physical address of a second virtual machine is not stored in the centralized controller, perform step 205. If the first response indicates that a physical address of a second virtual machine is stored in the centralized controller, perform step 208.

After receiving the first response, the first switching endpoint may further determine whether the first response indicates that the physical address of the second virtual machine is not stored in the centralized controller. If the first response indicates that the physical address of the second virtual machine is not stored in the centralized controller, perform step 205. If the first response indicates that the physical address of the second virtual machine is stored in the centralized controller, perform step 208.

Step 205: Send, in a unicast manner according to the first response, the address acquisition request separately to N switching endpoints that include a second switching endpoint.

After determining that the physical address of the second virtual machine is not stored in the centralized controller, the first switching endpoint may send, in the unicast manner according to the address list acquired from the first response, the address acquisition request separately to the N switching endpoints that include the second switching endpoint.

Understandably, the address acquisition request sent by the first switching endpoint to the N switching endpoints that include the second switching endpoint may carry the identifier of the virtual local area network.

Understandably, before sending, in the unicast manner, the address acquisition request separately to the N switching endpoints that include the second switching endpoint, the first switching endpoint may further perform tunnel encapsulation on the address acquisition request according to a communications protocol in the virtual local area network.

Step 206: The first switching endpoint receives a second response from the second switching endpoint.

After the first switching endpoint sends the address acquisition request to the N switching endpoints that include the second switching endpoint, the second switching endpoint receives the address acquisition request, the second switching endpoint sends the second response in response to the address acquisition request to the first switching endpoint, and the first switching endpoint receives the second response.

It should be noted that the second response includes the physical address of the second virtual machine.

It should be noted that if the second switching endpoint sends the second response to the centralized controller, the first switching endpoint may also receive the second response from the centralized controller.

Understandably, after receiving the second response, the first switching endpoint may further perform tunnel decapsulation on the second response according to the communications protocol in the virtual local area network.

Step 207: Send the second response to the first virtual machine.

After receiving the second response, the first switching endpoint sends the second response to the first virtual machine. The first virtual machine may acquire the physical address of the second virtual machine from the second response.

It should be noted that the first switching endpoint may acquire the physical address of the second virtual machine from the second response, and the first switching endpoint may send a correspondence between the physical address and the IP address of the second virtual machine to the centralized controller such that the centralized controller stores the correspondence.

Step 208: Send the first response to the first virtual machine.

The first switching endpoint determines that the physical address of the second virtual machine is stored in the centralized controller, and therefore the first response may carry the physical address of the second virtual machine. After receiving the first response, the first switching endpoint may send the first response to the first virtual machine such that the first virtual machine may acquire the physical address of the second virtual machine from the first response.

In this embodiment, before sending the address acquisition request to the N switching endpoints that include the second switching endpoint, the first switching endpoint may first determine whether the physical address of the second virtual machine is stored in the centralized controller. After receiving the second response, the first switching endpoint may further send the correspondence between the physical address and the IP address of the second virtual machine to the centralized controller such that the centralized controller may store the correspondence, and so that the physical address of the second virtual machine may be acquired directly from the centralized controller when the physical address of the second virtual machine is requested again. In this way, the first switching endpoint may acquire the physical address of the second virtual machine in multiple manners, which greatly increases flexibility of the solution.

For ease of understanding, the method for acquiring a physical address of a virtual machine in the embodiment of the present disclosure is detailed below using a specific application scenario.

In a virtual local area network N, a centralized controller A may manage multiple switching endpoints, where the switching endpoints may be physical switches, or may be virtual tunnel endpoint devices. For example, a switching endpoint a, a switching endpoint b, and a switching endpoint c exist. The switching endpoint a manages multiple virtual machines such as a virtual machine 1 and a virtual machine 2. The switching endpoint c also manages multiple virtual machines such as a virtual machine 3 and a virtual machine 4. The switching endpoint a and the virtual machine 1 and the virtual machine 2 managed by the switching endpoint a form a virtual local area subnet in the virtual local area network N, and the switching endpoint c and the virtual machine 3 and the virtual machine 4 form another virtual local area subnet in the virtual local area network N. When the virtual machine 1 wants to acquire a MAC address of the virtual machine 3, the virtual machine 1 sends an Address Resolution Protocol (ARP) address acquisition request to the switching endpoint a in a broadcast manner. The ARP address acquisition request carries an IP address of the virtual machine 3. For example, the IP address is 192.168.1.1. After receiving the ARP address acquisition request, the switching endpoint a forwards the ARP address acquisition request to the centralized controller A in the virtual local area network N. When forwarding the ARP address acquisition request to the centralized controller A, the switching endpoint a may further attach an identifier of the virtual local area network N to the ARP address acquisition request. For example, the identifier is a virtual local area network (VLAN). After receiving the ARP address acquisition request, the centralized controller A sends a first response to the switching endpoint a, where the first response includes an address list that includes an address of the switching endpoint b and an address of the switching endpoint c. For example, the address list is: an IP address of the switching endpoint b is 51.169.1.3, and an IP address of the switching endpoint c is 51.169.1.4. The switching endpoint a receives the first response, and then determines whether the first response indicates that the MAC address of the virtual machine 3 is not stored in the centralized controller A. If the first response indicates that the MAC address of the virtual machine 3 is stored in the centralized controller A, the first response includes the MAC address of the virtual machine 3. For example, the MAC address is 00-23-5A-15-99-42. The switching endpoint a sends the first response to the virtual machine 1, and the virtual machine 1 acquires the MAC address 00-23-5A-15-99-42 of the virtual machine 3 from the first response. If the first response indicates that the MAC address of the virtual machine 3 is not stored in the centralized controller A, it indicates that the MAC address of the virtual machine 3 is not stored in the centralized controller A. The switching endpoint a may perform tunnel encapsulation on the ARP address acquisition request using a communications protocol of the virtual local area network N, and then send the tunnel-encapsulated ARP address acquisition request to the switching endpoint b and the switching endpoint c according to the address list, where the address list is: the IP address of the switching endpoint b is 51.169.1.3, and the IP address of the switching endpoint c is 51.169.1.4. After receiving the tunnel-encapsulated ARP address acquisition request, the switching endpoint c may send a second response, where the second response includes the MAC address 00-23-5A-15-99-42 of the virtual machine 3. The switching endpoint a may acquire the second response directly from the switching endpoint c. If the switching endpoint c sends the second response to the centralized controller A, the switching endpoint a may also acquire the second response from the centralized controller A. If the second response is tunnel-encapsulated, the switching endpoint a may perform tunnel decapsulation on the second response according to the communications protocol of the virtual local area network N, and send the tunnel-decapsulated second response to the virtual machine 1. The virtual machine 1 may acquire the MAC address 00-23-5A-15-99-42 of the virtual machine 3 from the second response. The switching endpoint a may also acquire the MAC address 00-23-5A-15-99-42 of the virtual machine 3 from the second response, and send a correspondence between the IP address 192.168.1.1 and the MAC address 00-23-5A-15-99-42 of the virtual machine 3 to the centralized controller A such that the centralized controller A stores the correspondence, and such that another switching endpoint in the virtual local area network N may acquire the MAC address of the virtual machine 3 directly from the centralized controller when the other switching endpoint requests the MAC address of the virtual machine 3.

Figure 3:
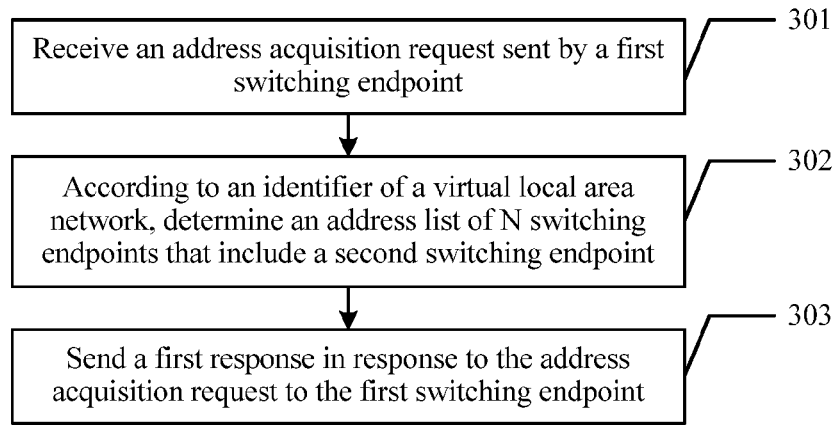
FIG. 3 is a schematic flowchart of another embodiment of a method for acquiring a physical address of a virtual machine according to an embodiment of the present disclosure.

In the embodiments shown in FIG. 1 and FIG. 2, a method for acquiring an address based on a virtual local area network is described from a perspective of a first switching endpoint. The following describes the method from a perspective of a centralized controller. Referring to FIG. 3, FIG. 3 is a schematic flowchart of another embodiment of a method for acquiring a physical address of a virtual machine according to an embodiment of the present disclosure. As shown in FIG. 3, the other embodiment of the method for acquiring a physical address of a virtual machine according to this embodiment of the present disclosure may include the following steps.

Step 301: Receive an address acquisition request sent by a first switching endpoint.

In a same virtual local area network, one centralized controller may manage multiple switching endpoints, and each switching endpoint may also manage multiple virtual machines. A switching endpoint and virtual machines managed by the switching endpoint form a virtual local area subnet. The centralized controller, the switching endpoints managed by the centralized controller, and virtual machines managed by the switching endpoints form a virtual local area network.

When a first virtual machine needs to request a physical address of a second virtual machine, the centralized controller receives the address acquisition request sent by the first switching endpoint in a broadcast manner, where the address acquisition request is used to request to acquire the physical address of the second virtual machine.

It should be noted that the first switching endpoint and the first virtual machine are located in a same virtual local area subnet, and the first virtual machine and the second virtual machine are located in a same virtual local area network and belong to different virtual local area subnets.

It should be noted that the address acquisition request may include an IP address of the second virtual machine.

It should be noted that the address acquisition request received by the centralized controller further carries an identifier of the virtual local area network to which the centralized controller belongs.

Understandably, the switching endpoint may be a physical switch, or may be a virtual tunnel endpoint device, which is not limited herein.

Step 302: According to an identifier of the virtual local area network, determine an address list of N switching endpoints that include a second switching endpoint.

After receiving the address acquisition request, the centralized controller may acquire, from the address acquisition request, the identifier of the virtual local area network to which the centralized controller belongs, and determine, according to the identifier, the address list of the N switching endpoints that include the second switching endpoint.

It should be noted that N is a positive integer, and the N switching endpoints are different switching endpoints in the virtual local area network in which the centralized controller is located.

Understandably, N is less than or equal to a quantity of all switching endpoints in the virtual local area network.

Step 303: Send a first response in response to the address acquisition request to the first switching endpoint.

After determining the address list of the N switching endpoints that include the second switching endpoint, the centralized controller sends the first response in response to the address acquisition request to the first switching endpoint.

It should be noted that the first response includes the address list, and the first response is used to instruct the first switching endpoint to send, in a unicast manner according to the address list, the address acquisition request separately to the N switching endpoints that include the second switching endpoint, which enables the first switching endpoint to receive a second response that is sent by the second switching endpoint and includes the physical address of the second virtual machine, and enables the first switching endpoint to send the received second response to the first virtual machine such that the first virtual machine may acquire the physical address of the second virtual machine from the second response.

Figure 4:
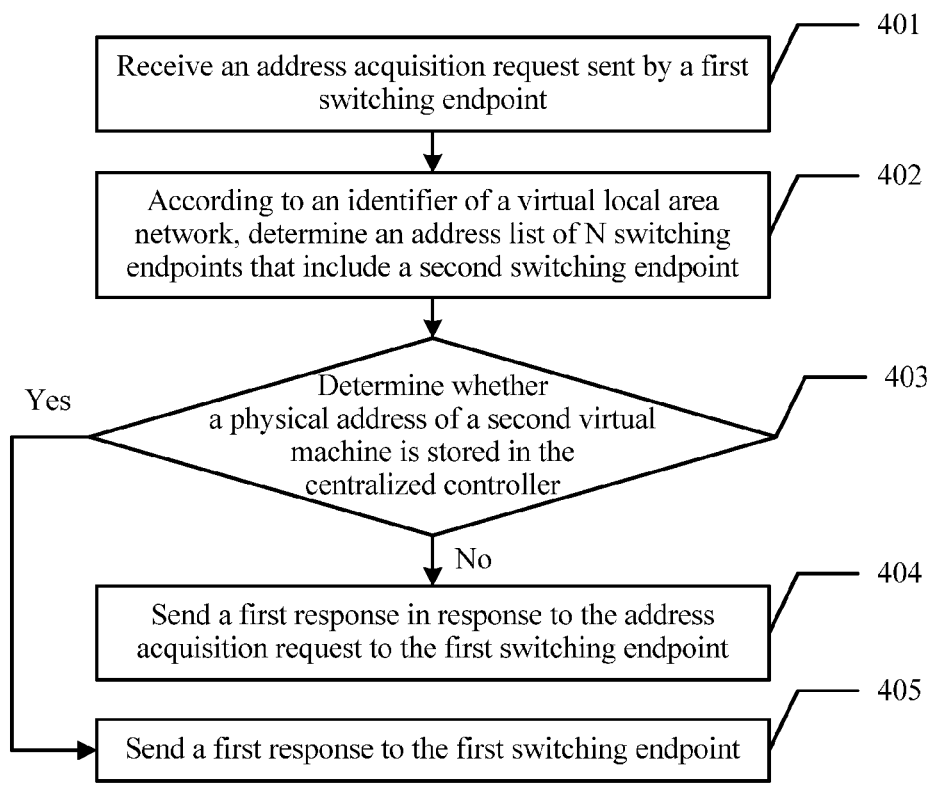
FIG. 4 is a schematic flowchart of another embodiment of a method for acquiring a physical address of a virtual machine according to an embodiment of the present disclosure.

In this embodiment, after receiving the address acquisition request sent by the first switching endpoint, the centralized controller determines, according to the identifier, the address list of the N switching endpoints that include the second switching endpoint, uses the first response to carry the address list, and sends the first response to the first switching endpoint. Therefore, the first switching endpoint can send, in the unicast manner according to the address list, the address acquisition request separately to the N switching endpoints that include the second switching endpoint, which enables the first switching endpoint to receive the second response that is sent by the second switching endpoint and includes the physical address of the second virtual machine, and enables the first switching endpoint to send the received second response to the first virtual machine such that the first virtual machine may acquire the physical address of the second virtual machine from the second response. In this way, when the first switching endpoint sends, in the unicast manner, the address acquisition request to the N switching endpoints that include the second switching endpoint, a quantity of multicast groups of the first switching endpoint no longer imposes a limitation. Therefore, switching endpoints that can be created by the virtual local area network to which the first switching endpoint belongs are no longer limited by the quantity of multicast groups of the first switching endpoint, and a quantity of switching endpoints in the same virtual local area network can be increased. In practical application, before sending the first response to the first switching endpoint, the centralized controller may further detect whether the physical address of the second virtual machine is stored in the centralized controller, which is detailed below using a specific embodiment. Referring to FIG. 4, FIG. 4 is a schematic flowchart of another embodiment of a method for acquiring a physical address of a virtual machine according to an embodiment of the present disclosure. As shown in FIG. 4, the other embodiment of the method for acquiring a physical address of a virtual machine according to this embodiment of the present disclosure may include the following steps.

Step 401: Receive an address acquisition request sent by a first switching endpoint.

In a same virtual local area network, one centralized controller may manage multiple switching endpoints, and each switching endpoint may also manage multiple virtual machines. A switching endpoint and virtual machines managed by the switching endpoint form a virtual local area subnet. The centralized controller, the switching endpoints managed by the centralized controller, and virtual machines managed by the switching endpoints form a virtual local area network.

When a first virtual machine needs to request a physical address of a second virtual machine, the centralized controller receives the address acquisition request sent by the first switching endpoint in a broadcast manner, where the address acquisition request is used to request to acquire the physical address of the second virtual machine.

It should be noted that the first switching endpoint and the first virtual machine are located in a same virtual local area subnet, and the first virtual machine and the second virtual machine are located in a same virtual local area network and belong to different virtual local area subnets.

It should be noted that the address acquisition request may include an IP address of the second virtual machine.

It should be noted that the address acquisition request received by the centralized controller further carries an identifier of the virtual local area network to which the centralized controller belongs.

Understandably, the switching endpoint may be a physical switch, or may be a virtual tunnel endpoint device, which is not limited herein.

Step 402: According to an identifier of the virtual local area network, determine an address list of N switching endpoints that include a second switching endpoint.

After receiving the address acquisition request, the centralized controller may acquire, from the address acquisition request, the identifier of the virtual local area network to which the centralized controller belongs, and determine, according to the identifier, the address list of the N switching endpoints that include the second switching endpoint.

It should be noted that N is a positive integer, and the N switching endpoints are different switching endpoints in the virtual local area network in which the centralized controller is located.

Understandably, N is less than or equal to a quantity of all switching endpoints in the virtual local area network.

Step 403: Determine whether a physical address of a second virtual machine is stored in the centralized controller.

After acquiring the identifier and the IP address of the second virtual machine, the centralized controller determines, according to the identifier and the IP address of the second virtual machine, whether the physical address of the second virtual machine is stored in the centralized controller. If no, perform step 404, if yes, perform step 405.

Step 404: Send a first response in response to the address acquisition request to the first switching endpoint.

After determining that the physical address of the second virtual machine is not stored in the centralized controller, the centralized controller sends the first response in response to the address acquisition request to the first switching endpoint.

It should be noted that the first response includes the address list, and the first response is used to instruct the first switching endpoint to send, in a unicast manner according to the address list, the address acquisition request separately to the N switching endpoints that include the second switching endpoint, which enables the first switching endpoint to receive a second response that is sent by the second switching endpoint and includes the physical address of the second virtual machine, and enables the first switching endpoint to send the received second response to the first virtual machine such that the first virtual machine may acquire the physical address of the second virtual machine from the second response.

It should be noted that after the centralized controller sends the first response to the first switching endpoint, the centralized controller may further acquire a correspondence between the physical address of the second virtual machine and the IP address of the second virtual machine, and store the correspondence.

Understandably, the centralized controller may acquire the correspondence from the first switching endpoint, or may acquire the correspondence from the second switching endpoint, which is not limited herein.

Step 405: Send a first response to the first switching endpoint.

The centralized controller attaches the physical address of the second virtual machine to the first response, and sends the first response to the first switching endpoint. Therefore, the first switching endpoint forwards the first response to the first virtual machine such that the first virtual machine may acquire the physical address of the second virtual machine from the first response.

In this embodiment, before sending the first response to the first switching endpoint, the centralized controller may first determine whether the physical address of the second virtual machine is stored in the centralized controller, and if the physical address of the second virtual machine is not stored, send the first response that includes the address list to the first switching endpoint, or if the physical address of the second virtual machine is stored, attach the physical address of the second virtual machine to the first response and send the first response to the first switching endpoint such that the first virtual machine acquires the physical address of the second virtual machine. The centralized controller may further store the correspondence between the physical address of the second virtual machine and the IP address of the second virtual machine after acquiring the physical address of the second virtual machine.

For ease of understanding, the method for acquiring a physical address of a virtual machine in the embodiment of the present disclosure is detailed below using a specific application scenario.

In a virtual local area network N, a centralized controller A may manage multiple switching endpoints, where the switching endpoints may be physical switches, or may be virtual tunnel endpoint devices. For example, a switching endpoint a, a switching endpoint b, and a switching endpoint c exist. The switching endpoint a manages multiple virtual machines such as a virtual machine 1 and a virtual machine 2. The switching endpoint c also manages multiple virtual machines such as a virtual machine 3 and a virtual machine 4. The switching endpoint a and the virtual machine 1 and the virtual machine 2 managed by the switching endpoint a form a virtual local area subnet in the virtual local area network N, and the switching endpoint c and the virtual machine 3 and the virtual machine 4 form another virtual local area subnet in the virtual local area network N. When the virtual machine 1 wants to acquire a MAC address of the virtual machine 3, the centralized controller A receives an ARP address acquisition request sent by the switching endpoint a. The ARP address acquisition request is sent by the virtual machine 1 to the switching endpoint a in a broadcast manner. The ARP address acquisition request carries an IP address of the virtual machine 3. For example, the IP address is 192.168.1.1. The ARP address acquisition request further includes an identifier of the local area network N. For example, the identifier is VLAN. After receiving the ARP address acquisition request, the centralized controller A may acquire the identifier VLAN of the virtual local area network and the IP address 192.168.1.1 of the virtual machine 3 from the ARP address acquisition request. According to the identifier VLAN and the IP address 192.168.1.1 of the virtual machine 3, the centralized controller A determines whether the MAC address of the virtual machine 3 is stored in a correspondence table of an IP address and a MAC address of the centralized controller A. If the MAC address of the virtual machine 3, for example, 00-23-5A-15-99-42, is stored, the centralized controller A sends the MAC address to the switching endpoint a such that the switching endpoint a sends the MAC address to the virtual machine 1. In this way, the virtual machine 1 may acquire the MAC address 00-23-5A-15-99-42 of the virtual machine 3. If the MAC address of the virtual machine 3 is not stored in the centralized controller A, the centralized controller A uses a first response to include an address list that includes addresses of the switching endpoint b and the switching endpoint c, and sends the first response to the switching endpoint a. For example, the address list is: an IP address of the switching endpoint b is 51.169.1.3, and an IP address of the switching endpoint c is 51.169.1.4. The first response further instructs the switching endpoint a to send the tunnel-encapsulated ARP address acquisition request to the switching endpoint b and the switching endpoint c according to the address list, where the address list is: the IP address of the switching endpoint b is 51.169.1.3, and the IP address of the switching endpoint c is 51.169.1.4. The instruction further causes the switching endpoint a to send a second response to the virtual machine 1 after receiving the second response that is sent by the switching endpoint c and includes the MAC address 00-23-5A-15-99-42 of the virtual machine 3. In this way, the virtual machine 1 may acquire the MAC address 00-23-5A-15-99-42 of the virtual machine 3. The centralized controller A may acquire a correspondence between the IP address 192.168.1.1 and the MAC address 00-23-5A-15-99-42 of the virtual machine 3 from the switching endpoint a or the switching endpoint c. The centralized controller A stores the correspondence such that another switching endpoint in the virtual local area network N may acquire the MAC address of the virtual machine 3 directly from the centralized controller when needing to request the MAC address of the virtual machine 3.

Figure 5:
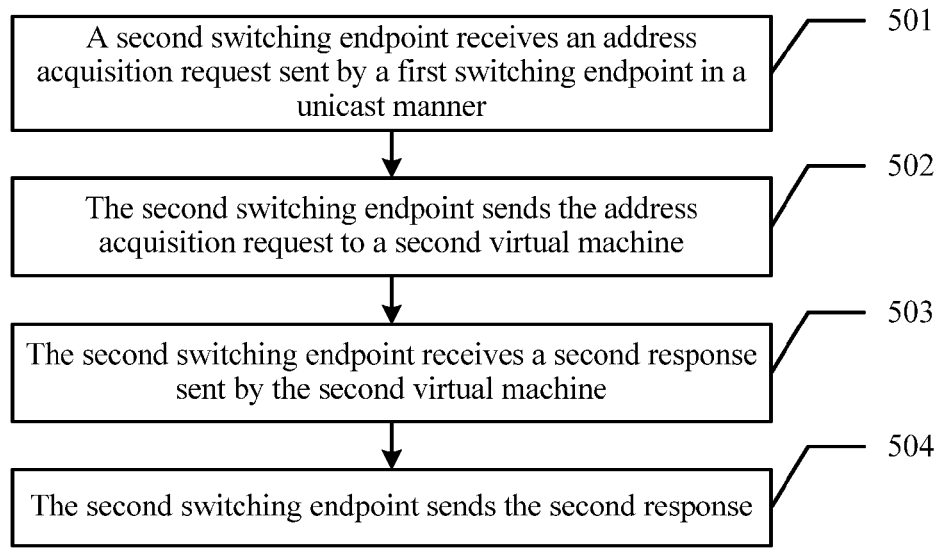
FIG. 5 is a schematic flowchart of another embodiment of a method for acquiring a physical address of a virtual machine according to an embodiment of the present disclosure.

In FIG. 1 to FIG. 2 and FIG. 3 to FIG. 4 above, a method for acquiring a physical address of a virtual machine is described from a perspective of a first switching endpoint and a centralized controller respectively. The following describes the method from a perspective of a second switching endpoint. Referring to FIG. 5, FIG. 5 is a schematic flowchart of another embodiment of a method for acquiring a physical address of a virtual machine according to an embodiment of the present disclosure. As shown in FIG. 5, the other embodiment of the method for acquiring a physical address of a virtual machine according to this embodiment of the present disclosure may include the following steps.

Step 501: A second switching endpoint receives an address acquisition request sent by a first switching endpoint in a unicast manner.

In a same virtual local area network, one centralized controller may manage multiple switching endpoints, and each switching endpoint may also manage multiple virtual machines. A switching endpoint and virtual machines managed by the switching endpoint form a virtual local area subnet. The centralized controller, the switching endpoints managed by the centralized controller, and virtual machines managed by the switching endpoints form a virtual local area network.

When a first virtual machine needs to request to acquire a physical address of a second virtual machine, the second switching endpoint receives the address acquisition request sent by the first switching endpoint in the unicast manner.

It should be noted that the address acquisition request is sent by the first virtual machine to the first switching endpoint, and is used to request to acquire the physical address of the second virtual machine.

Step 502: The second switching endpoint sends the address acquisition request to a second virtual machine.

After receiving the address acquisition request, the second switching endpoint determines that the address acquisition request is used to request the physical address of the second virtual machine managed by the second switching endpoint, and therefore, the second switching endpoint sends the address acquisition request to the second virtual machine.

Step 503: The second switching endpoint receives a second response sent by the second virtual machine.

After the second switching endpoint sends the address acquisition request to the second virtual machine, the second virtual machine receives the address acquisition request and sends the second response to the second switching endpoint, and the second switching endpoint receives the second response.

It should be noted that the second response includes the physical address of the second virtual machine.

Step 504: The second switching endpoint sends the second response.

After receiving the second response, the second switching endpoint sends the second response such that the first switching endpoint receives the second response, and such that the first switching endpoint sends the second response to the first virtual machine. In this way, the first virtual machine may acquire the physical address of the second virtual machine from the second response.

Figure 6:
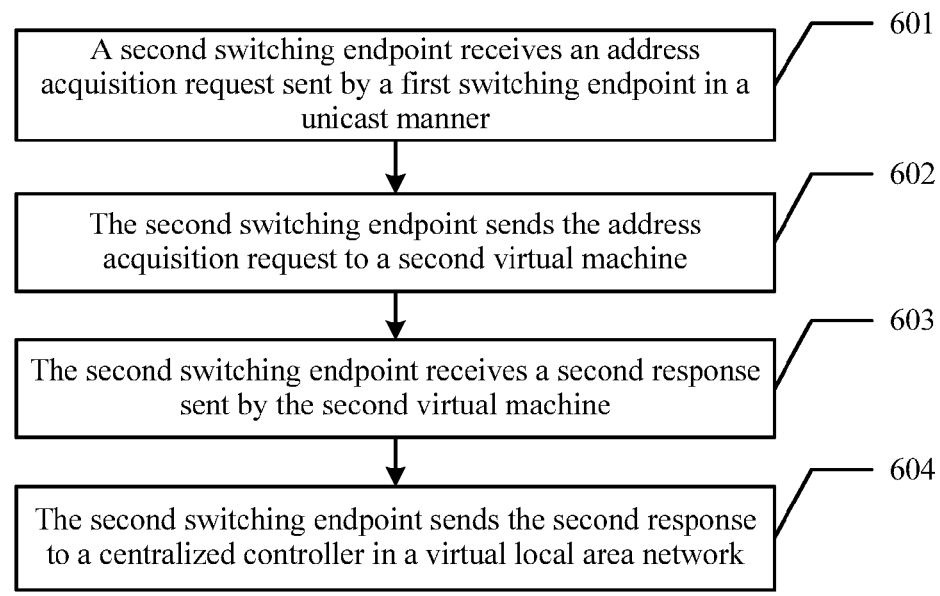
FIG. 6 is a schematic flowchart of another embodiment of a method for acquiring a physical address of a virtual machine according to an embodiment of the present disclosure.

In this embodiment, after receiving the address acquisition request sent by the first switching endpoint in the unicast manner, the second switching endpoint sends the address acquisition request to the second virtual machine. After receiving the second response that is sent by the second virtual machine and includes the physical address of the second virtual machine, the second switching endpoint sends the second response such that the first switching endpoint receives the response, and such that the first switching endpoint sends the second response to the first virtual machine. In this way, the first virtual machine may acquire the physical address of the second virtual machine from the second response. In practical application, the second switching endpoint may send the second response in multiple manners such that the first switching endpoint receives the second response, which is detailed below using a specific embodiment. Referring to FIG. 6, which is a schematic flowchart of another embodiment of a method for acquiring a physical address of a virtual machine according to an embodiment of the present disclosure. As shown in FIG. 6, the other embodiment of the method for acquiring a physical address of a virtual machine according to this embodiment of the present disclosure may include the following steps.

Step 601: A second switching endpoint receives an address acquisition request sent by a first switching endpoint in a unicast manner.

In a same virtual local area network, one centralized controller may manage multiple switching endpoints, and each switching endpoint may also manage multiple virtual machines. A switching endpoint and virtual machines managed by the switching endpoint form a virtual local area subnet. The centralized controller, the switching endpoints managed by the centralized controller, and virtual machines managed by the switching endpoints form a virtual local area network.

When a first virtual machine needs to request to acquire a physical address of a second virtual machine, the second switching endpoint receives the address acquisition request sent by the first switching endpoint in the unicast manner.

It should be noted that the address acquisition request is sent by the first virtual machine to the first switching endpoint, and is used to request to acquire the physical address of the second virtual machine.

Understandably, the switching endpoint may be a physical switch, or may be a virtual tunnel endpoint device, which is not limited herein.

Step 602: The second switching endpoint sends the address acquisition request to a second virtual machine.

After receiving the address acquisition request, the second switching endpoint determines that the address acquisition request is used to request the physical address of the second virtual machine managed by the second switching endpoint, and therefore, the second switching endpoint sends the address acquisition request to the second virtual machine.

It should be noted that if the received address acquisition request is tunnel-encapsulated, before sending the address acquisition request to the second virtual machine, the second switching endpoint may further perform tunnel decapsulation on the address acquisition request according to a communications protocol in the virtual local area network.

Step 603: The second switching endpoint receives a second response sent by the second virtual machine.

After the second switching endpoint sends the address acquisition request to the second virtual machine, the second virtual machine receives the address acquisition request and sends the second response to the second switching endpoint, and the second switching endpoint receives the second response.

It should be noted that the second response includes the physical address of the second virtual machine.

Step 604: The second switching endpoint sends the second response to a centralized controller of the virtual local area network.

After receiving the second response, the second switching endpoint sends the second response to the centralized controller such that the centralized controller forwards the second response to the first switching endpoint, and the first switching endpoint sends the second response to the first virtual machine. In this way, the first virtual machine may acquire the physical address of the second virtual machine from the second response.

It should be noted that after receiving the second response, the second switching endpoint may further send the second response directly to the first switching endpoint such that the first switching endpoint sends the second response to the first virtual machine.

Understandably, before sending the second response to the first switching endpoint, the second switching endpoint may further perform tunnel encapsulation on the second response according to the communications protocol in the virtual local area network.

Understandably, the second switching endpoint sends the second response to the centralized controller such that the centralized controller may acquire a correspondence between the physical address of the second virtual machine and an IP address of the second virtual machine, and such that the centralized controller stores the correspondence.

In this embodiment, after receiving the second response, the second switching endpoint may send the second response in multiple manners such that the first switching endpoint receives the second response that includes the physical address of the second virtual machine. In this way, the first virtual machine acquires the physical address of the second virtual machine.

For ease of understanding, a method for acquiring a physical address of a virtual machine in an embodiment of the present disclosure is detailed below using a specific application scenario.

In a virtual local area network N, a centralized controller A may manage multiple switching endpoints, where the switching endpoints may be physical switches, or may be virtual tunnel endpoint devices. For example, a switching endpoint a, a switching endpoint b, and a switching endpoint c exist. The switching endpoint a manages multiple virtual machines such as a virtual machine 1 and a virtual machine 2. The switching endpoint c also manages multiple virtual machines such as a virtual machine 3 and a virtual machine 4. The switching endpoint a and the virtual machine 1 and the virtual machine 2 managed by the switching endpoint a form a virtual local area subnet in the virtual local area network N, and the switching endpoint c and the virtual machine 3 and the virtual machine 4 form another virtual local area subnet in the virtual local area network N. When the virtual machine 1 wants to acquire a MAC address of the virtual machine 3, the switching endpoint c receives an ARP address acquisition request sent by the switching endpoint a. The ARP address acquisition request is sent by the virtual machine 1 to the switching endpoint a in a broadcast manner. The ARP address acquisition request carries an IP address of the virtual machine 3. For example, the IP address is 192.168.1.1. The ARP address acquisition request further includes an identifier of the local area network N. For example, the identifier is VLAN. After receiving the ARP address acquisition request, the second switching endpoint may perform tunnel decapsulation on the ARP address acquisition request according to a communications protocol of the virtual local area network N, and then the switching endpoint c sends the decapsulated ARP address acquisition request to the virtual machine 3. After receiving the ARP address acquisition request, the virtual machine 3 sends a second response to the switching endpoint c. The second response includes the MAC address of the virtual machine 3. For example, the MAC address is 00-23-5A-15-99-42. After receiving the second response, the switching endpoint c may send the second response to the centralized controller A such that the centralized controller A receives the second response and forwards the second response to the switching endpoint a, and the switching endpoint a sends the second response to the virtual machine 1. In this way, the virtual machine 1 may acquire the MAC address 00-23-5A-15-99-42 of the virtual machine 3 from the second response. Sending, by the switching endpoint c, the second response to the centralized controller A further enables the centralized controller A to acquire a correspondence between the IP address 192.168.1.1 and the MAC address 00-23-5A-15-99-42 of the virtual machine 3 from the second response and store the correspondence. After receiving the second response, the switching endpoint c further performs tunnel encapsulation on the second response according to the communications protocol of the virtual local area network N, and sends the tunnel-encapsulated second response directly to the switching endpoint a such that the switching endpoint a sends the second response to the virtual machine 1. In this way, the virtual machine 1 may acquire the MAC address 00-23-5A-15-99-42 of the virtual machine 3 from the second response.

Figure 7:
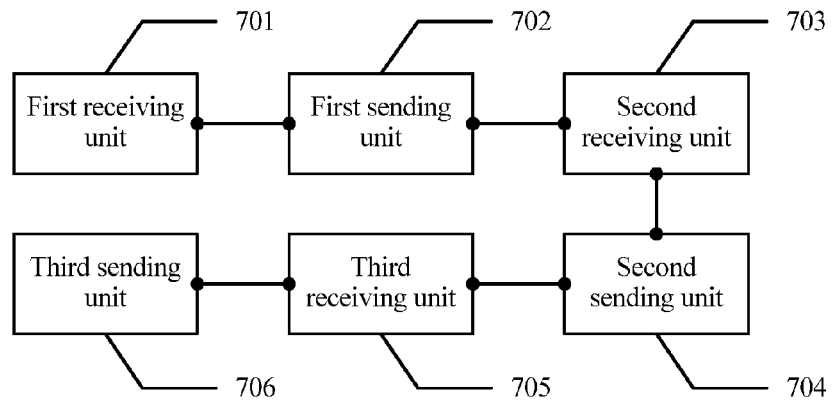
FIG. 7 is a schematic structural diagram of an embodiment of a first switching endpoint according to an embodiment of the present disclosure.

FIG. 1, FIG. 2, FIG. 3, FIG. 4, FIG. 5, and FIG. 6 describe a method for acquiring a physical address of a virtual machine according to an embodiment of the present disclosure, and the following describes a first switching endpoint in an embodiment of the present disclosure. Referring to FIG. 7, FIG. 7 is a schematic structural diagram of an embodiment of a first switching endpoint according to an embodiment of the present disclosure. As shown in FIG. 7, the first switching endpoint provided in this embodiment of the present disclosure is used for a first virtual machine to acquire a physical address of a second virtual machine, where the first virtual machine and the second virtual machine belong to a same virtual local area network and do not belong to a same virtual local area subnet. The first switching endpoint may include a first receiving unit 701 configured to receive an address acquisition request sent by the first virtual machine, where the address acquisition request carries an IP address of the second virtual machine and is used to request the physical address of the second virtual machine, the first virtual machine and the first switching endpoint belong to a same virtual local area subnet, and the second virtual machine and a second switching endpoint belong to a same virtual local area subnet, a first sending unit 702 configured to send the address acquisition request to a centralized controller in the virtual local area network, a second receiving unit 703 configured to receive a first response sent by the centralized controller in response to the address acquisition request, where the first response includes an address list of N switching endpoints that include the second switching endpoint, N is a positive integer, and the N switching endpoints are different switching endpoints that belong to the virtual local area network, a second sending unit 704 configured to send, in a unicast manner according to the first response, the address acquisition request separately to the N switching endpoints that comprise the second switching endpoint, a third receiving unit 705 configured to receive a second response in response to the address acquisition request, where the second response is sent by the second switching endpoint to which the second virtual machine belongs, and the second response includes the physical address of the second virtual machine, and a third sending unit 706 configured to send the second response to the first virtual machine.

In this embodiment, a first receiving unit 701 receives an address acquisition request sent by a first virtual machine, where the address acquisition request includes an IP address of a second virtual machine and is used to request a physical address of the second virtual machine, the first virtual machine and a first switching endpoint belong to a same virtual local area subnet, the second virtual machine and a second switching endpoint belong to a same virtual local area subnet, and the first switching endpoint and the second switching endpoint are located in a same virtual local area network and belong to different virtual local area subnets. A first sending unit 702 sends the address acquisition request to a centralized controller in the virtual local area network, where the address acquisition request includes an identifier of a virtual local area network in which the first virtual machine is located. A second receiving unit 703 receives a first response sent by the centralized controller in response to the address acquisition request, where the first response includes an address list of N switching endpoints that include the second switching endpoint, N is a positive integer, and the N switching endpoints are different switching endpoints that belong to the virtual local area network. A second sending unit 704 sends, in a unicast manner according to the first response, the address acquisition request separately to the N switching endpoints that include the second switching endpoint. A third receiving unit 705 receives a second response in response to the address acquisition request, where the second response is sent by the second switching endpoint to which the second virtual machine belongs, and the second response includes the physical address of the second virtual machine, and a third sending unit 706 sends the second response to the first virtual machine. In this way, when the second sending unit 704 sends, in the unicast manner, the address acquisition request to the N switching endpoints that include the second switching endpoint, a quantity of multicast groups of the first switching endpoint no longer imposes a limitation. Therefore, switching endpoints that can be created by the virtual local area network to which the first switching endpoint belongs are no longer limited by the quantity of multicast groups of the first switching endpoint, and a quantity of switching endpoints in the same virtual local area network can be increased.

Figure 8:
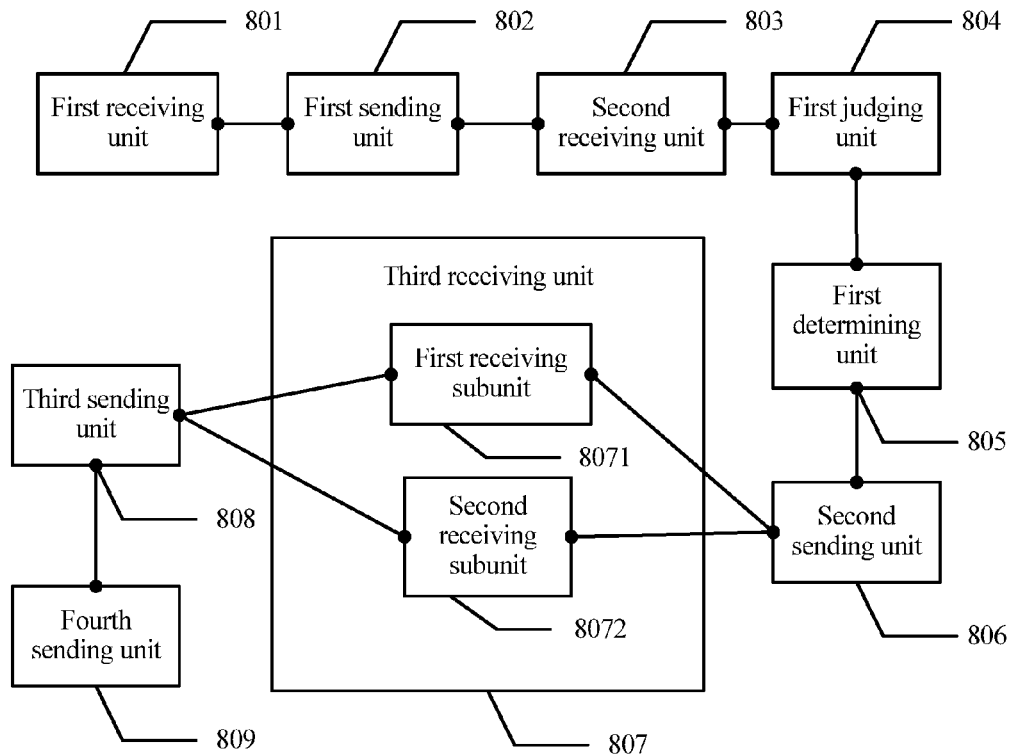
FIG. 8 is a schematic structural diagram of another embodiment of a first switching endpoint according to an embodiment of the present disclosure.

As described in the embodiment shown in FIG. 7, after the first receiving unit 701 receives the address acquisition request sent by the first virtual machine, the second sending unit 704 sends, in the unicast manner, the request to the N switching endpoints that include the second switching endpoint. After the third receiving unit 705 receives the second response that is sent by the second switching endpoint and includes the physical address of the second virtual machine, the third sending unit 706 sends the second response to the first virtual machine such that the first virtual machine may acquire the physical address of the second virtual machine by means of the second response. In practical application, the first switching endpoint may further include another unit configured to make a judgment on the received first response sent by the centralized controller, which is detailed below using a specific embodiment. Referring to FIG. 8, FIG. 8 is a schematic structural diagram of another embodiment of a first switching endpoint according to an embodiment of the present disclosure. As shown in FIG. 8, the first switching endpoint provided in this embodiment of the present disclosure is used for a first virtual machine to acquire a physical address of a second virtual machine, where the first virtual machine and the second virtual machine belong to a same virtual local area network and do not belong to a same virtual local area subnet. The first switching endpoint may include a first receiving unit 801 configured to receive an address acquisition request sent by the first virtual machine, where the address acquisition request carries an IP address of the second virtual machine and is used to request the physical address of the second virtual machine, the first virtual machine and the first switching endpoint belong to a same virtual local area subnet, and the second virtual machine and a second switching endpoint belong to a same virtual local area subnet, a first sending unit 802 configured to send the address acquisition request to a centralized controller in the virtual local area network, a second receiving unit 803 configured to receive a first response sent by the centralized controller in response to the address acquisition request, where the first response includes an address list of N switching endpoints that include the second switching endpoint, N is a positive integer, and the N switching endpoints are different switching endpoints that belong to the virtual local area network, a second sending unit 806 configured to send, in a unicast manner according to the first response, the address acquisition request separately to the N switching endpoints that comprise the second switching endpoint, a third receiving unit 807 configured to receive a second response in response to the address acquisition request, where the second response is sent by the second switching endpoint to which the second virtual machine belongs, and the second response includes the physical address of the second virtual machine, and a third sending unit 808 configured to send the second response to the first virtual machine.

The first switching endpoint provided in this embodiment of the present disclosure may further include a first judging unit 804 configured to determine whether the physical address of the second virtual machine is not stored in the centralized controller as indicated by the first response, a first determining unit 805 configured to trigger the second sending unit 806 to perform sending, in a unicast manner according to the first response, the address acquisition request separately to the N switching endpoints that comprise the second switching endpoint if the physical address of the second virtual machine is not stored in the centralized controller, and a fourth sending unit 809 configured to send a correspondence between the physical address and the IP address of the second virtual machine to the centralized controller such that the centralized controller stores the correspondence.

The third receiving unit 807 provided in this embodiment of the present disclosure may further include a first receiving subunit 8071 configured to receive the second response from the second switching endpoint, and a second receiving subunit 8072 configured to receive the second response from the centralized controller, where the second response is sent by the second switching endpoint to the centralized controller.

It should be noted that the third receiving unit 807 includes at least either of the first receiving subunit 8071 and the second receiving subunit 8072.

In this embodiment, before the second sending unit 806 sends the address acquisition request to the N switching endpoints that include the second switching endpoint, the first judging unit 804 may first determine whether the physical address of the second virtual machine is stored in the centralized controller. After the third receiving unit 807 receives the second response, the fourth sending unit 809 may further send the correspondence between the physical address and the IP address of the second virtual machine to the centralized controller such that the centralized controller may store the correspondence, and such that the physical address of the second virtual machine may be acquired directly from the centralized controller when the physical address of the second virtual machine is requested again. In this way, the first switching endpoint may acquire the physical address of the second virtual machine in multiple manners, which greatly increases flexibility of the solution.

For ease of understanding, interaction between units in a first switching endpoint in an embodiment of the present disclosure is detailed below using a specific application scenario.

In a virtual local area network N, a centralized controller A may manage multiple switching endpoints, where the switching endpoints may be physical switches, or may be virtual tunnel endpoint devices. For example, a switching endpoint a, a switching endpoint b, and a switching endpoint c exist. The switching endpoint a manages multiple virtual machines such as a virtual machine 1 and a virtual machine 2. The switching endpoint c also manages multiple virtual machines such as a virtual machine 3 and a virtual machine 4. The switching endpoint a and the virtual machine 1 and the virtual machine 2 managed by the switching endpoint a form a virtual local area subnet in the virtual local area network N, and the switching endpoint c and the virtual machine 3 and the virtual machine 4 form another virtual local area subnet in the virtual local area network N. When the virtual machine 1 wants to acquire a MAC address of the virtual machine 3, the virtual machine 1 sends an ARP address acquisition request to a first receiving unit 801 in the switching endpoint a in a broadcast manner. The ARP address acquisition request carries an IP address of the virtual machine 3. For example, the IP address is 192.168.1.1. After the first receiving unit 801 receives the ARP address acquisition request, a first sending unit 802 forwards the ARP address acquisition request to the centralized controller A in the virtual local area network N. When forwarding the ARP address acquisition request to the centralized controller A, the first sending unit 802 may further attach an identifier of the virtual local area network N to the ARP address acquisition request. For example, the identifier is VLAN. After receiving the ARP address acquisition request, the centralized controller A sends a first response to the switching endpoint a, where the first response includes an address list of addresses of the switching endpoint b and the switching endpoint c. For example, the address list is: an IP address of the switching endpoint b is 51.169.1.3, and an IP address of the switching endpoint c is 51.169.1.4. A second receiving unit 803 receives the first response, and then a first judging unit 804 determines whether the first response indicates that the MAC address of the virtual machine 3 is not stored in the centralized controller A. If the first response indicates that the MAC address of the virtual machine 3 is not stored in the centralized controller A, a first determining unit 805 determines that the MAC address of the virtual machine 3 is not stored in the centralized controller. A second sending unit 806 sends the tunnel-encapsulated ARP address acquisition request to the switching endpoint b and the switching endpoint c according to the address list, where the address list is: an IP address of the switching endpoint b is 51.169.1.3, and an IP address of the switching endpoint c is 51.169.1.4. After receiving the tunnel-encapsulated ARP address acquisition request, the switching endpoint c may send a second response, where the second response includes the MAC address 00-23-5A-15-99-42 of the virtual machine 3. A first receiving subunit 8071 in a third receiving unit 807 may acquire the second response directly from the switching endpoint c. If the switching endpoint c sends the second response to the centralized controller A, a second receiving subunit 8072 may also acquire the second response from the centralized controller A. If the second response is tunnel-encapsulated, the switching endpoint a may perform tunnel decapsulation on the second response according to a communications protocol of the virtual local area network N. A third sending unit 808 sends the tunnel-decapsulated second response to the virtual machine 1, and the virtual machine 1 may acquire the MAC address 00-23-5A-15-99-42 of the virtual machine 3 from the second response. A fourth sending unit 809 may further send an acquired correspondence between the IP address 192.168.1.1 and the MAC address 00-23-5A-15-99-42 of the virtual machine 3 to the centralized controller A such that the centralized controller A stores the correspondence, and such that another switching endpoint in the virtual local area network N may acquire the MAC address of the virtual machine 3 directly from the centralized controller when needing to request the MAC address of the virtual machine 3.

Figure 9:
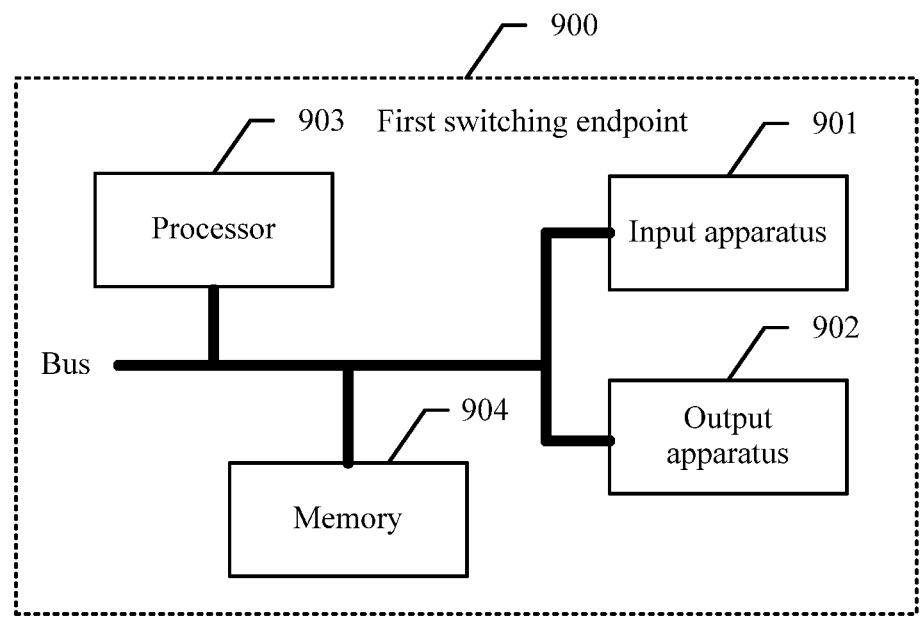
FIG. 9 is a schematic structural diagram of another embodiment of a switching endpoint according to an embodiment of the present disclosure.

The foregoing describes the first switching endpoint in the embodiment of the present disclosure from a perspective of a modular function entity, and the following describes a first switching endpoint in an embodiment of the present disclosure from a perspective of hardware processing. Referring to FIG. 9, another embodiment of a first switching endpoint 900 according to an embodiment of the present disclosure includes an input apparatus 901, an output apparatus 902, a processor 903, and a memory 904 (a quantity of processors 903 in a first switching endpoint 900 may be one or more, and FIG. 9 uses one processor 903 as an example). In some embodiments of the present disclosure, the input apparatus 901, the output apparatus 902, the processor 903, and the memory 904 may be connected using a bus or by other means, and FIG. 9 uses a bus connection as an example, where by invoking an operation instruction stored in the memory 904, the processor 903 is configured to perform the steps of receiving an address acquisition request sent by a first virtual machine, sending the address acquisition request to a centralized controller of a virtual local area network, receiving a first response sent by the centralized controller in response to the address acquisition request, sending, in a unicast manner according to the first response, the address acquisition request separately to N switching endpoints that include a second switching endpoint, receiving a second response in response to the address acquisition request, and sending the second response to the first virtual machine.

In some embodiments of the present disclosure, the processor 903 is further configured to perform the steps of determining whether the first response indicates that a physical address of a second virtual machine is not stored in the centralized controller, and if the first response indicates that a physical address of a second virtual machine is not stored in the centralized controller, performing the step of sending, in a unicast manner according to the first response, the address acquisition request separately to N switching endpoints that include a second switching endpoint.

In some embodiments of the present disclosure, the processor 903 is further configured to perform the steps of receiving the second response from the second switching endpoint, and/or, receiving the second response from the centralized controller, where the second response is sent by the second switching endpoint to the centralized controller.

In some embodiments of the present disclosure, the processor 903 is further configured to perform the following step sending a correspondence between the physical address and an IP address of the second virtual machine to the centralized controller such that the centralized controller stores the correspondence.

Figure 10:
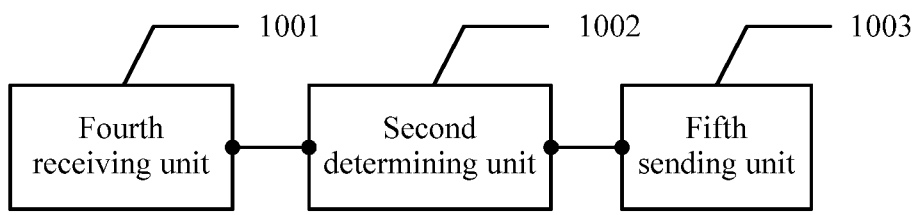
FIG. 10 is a schematic structural diagram of an embodiment of a centralized controller according to an embodiment of the present disclosure.

FIG. 7, FIG. 8, and FIG. 9 above describe the first switching endpoint provided in the embodiment of the present disclosure, and the following describes a centralized controller provided in an embodiment of the present disclosure. Referring to FIG. 10, FIG. 10 is a schematic structural diagram of an embodiment of a centralized controller according to an embodiment of the present disclosure. As shown in FIG. 10, the centralized controller provided in this embodiment of the present disclosure is used for a first virtual machine to acquire a physical address of a second virtual machine, where the first virtual machine and the second virtual machine belong to a same virtual local area network and do not belong to a same virtual local area subnet. The centralized controller may include a fourth receiving unit 1001 configured to receive an address acquisition request sent by a first switching endpoint to which the first virtual machine belongs, where the address acquisition request is sent by the first virtual machine in a broadcast manner, the address acquisition request carries an IP address of the second virtual machine and is used to request the physical address of the second virtual machine, and the address acquisition request includes an identifier of a virtual local area network in which the first virtual machine is located, a second determining unit 1002 configured to determine, according to the identifier of the virtual local area network, an address list of N switching endpoints that include a second switching endpoint, where N is a positive integer, and the N switching endpoints are different switching endpoints that belong to the virtual local area network, and a fifth sending unit 1003 configured to send a first response in response to the address acquisition request to the first switching endpoint, where the first response includes the address list, and the first response is used to instruct the first switching endpoint to send, in a unicast manner, the address acquisition request separately to the N switching endpoints that include the second switching endpoint such that the first switching endpoint can receive a second response that is sent by the second switching endpoint and includes the physical address of the second virtual machine, and such that the first switching endpoint sends the received second response to the first virtual machine.

Figure 11:
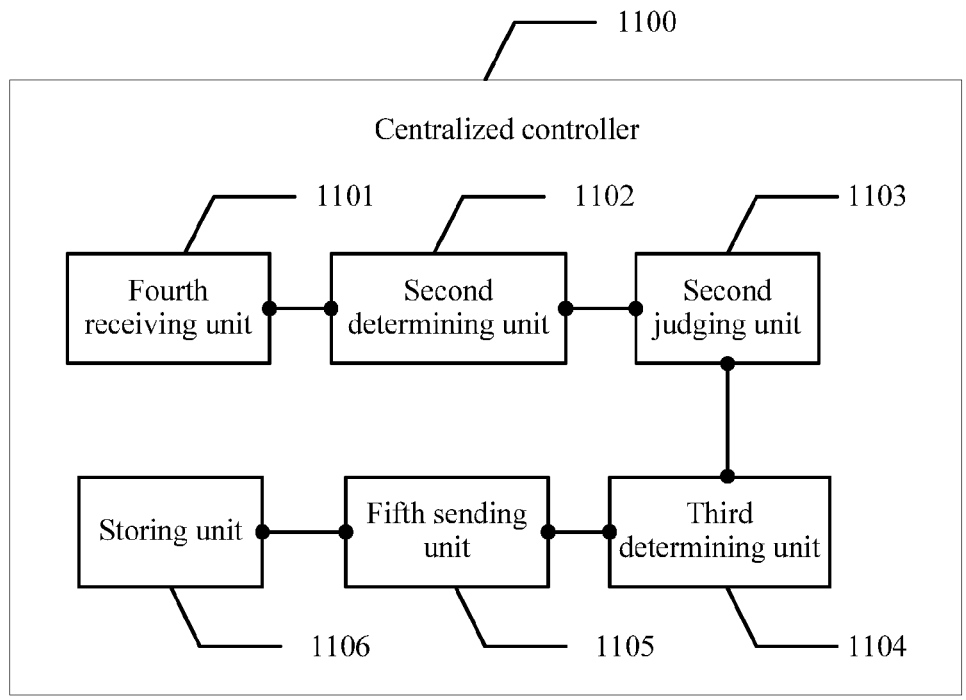
FIG. 11 is a schematic structural diagram of another embodiment of a centralized controller according to an embodiment of the present disclosure.

In this embodiment, after the fourth receiving unit 1001 receives the address acquisition request sent by the first switching endpoint, the second determining unit 1002 determines, according to the identifier, the address list of the N switching endpoints that include the second switching endpoint, and the fifth sending unit 1003 uses the first response to carry the address list and sends the first response to the first switching endpoint. Therefore, the first switching endpoint can send, in the unicast manner according to the address list, the address acquisition request separately to the N switching endpoints that include the second switching endpoint, which enables the first switching endpoint to receive the second response that is sent by the second switching endpoint and includes the physical address of the second virtual machine, and enables the first switching endpoint to send the received second response to the first virtual machine such that the first virtual machine may acquire the physical address of the second virtual machine from the second response. In this way, when the first switching endpoint sends, in the unicast manner, the address acquisition request to the N switching endpoints that include the second switching endpoint, a quantity of multicast groups of the first switching endpoint no longer imposes a limitation. Therefore, switching endpoints that can be created by the virtual local area network to which the first switching endpoint belongs are no longer limited by the quantity of multicast groups of the first switching endpoint, and a quantity of switching endpoints in the same virtual local area network can be increased. In practical application, the centralized controller may further include another unit configured to further detect whether the physical address of the second virtual machine and a correspondence between the physical address and the IP address of the second virtual machine are stored in the centralized controller before sending the first response to the first switching endpoint, which is detailed below using a specific embodiment. Referring to FIG. 11, FIG. 11 is a schematic structural diagram of another embodiment of a centralized controller according to an embodiment of the present disclosure. As shown in FIG. 11, another embodiment of a centralized controller 1100 according to this embodiment of the present disclosure may include a fourth receiving unit 1101 configured to receive an address acquisition request sent by a first switching endpoint to which a first virtual machine belongs, where the address acquisition request is sent by the first virtual machine in a broadcast manner, the address acquisition request carries an IP address of a second virtual machine and is used to request a physical address of the second virtual machine, and the address acquisition request includes an identifier of the virtual local area network in which the first virtual machine is located, a second determining unit 1102 configured to determine, according to the identifier of the virtual local area network, an address list of N switching endpoints that include a second switching endpoint, where N is a positive integer, and the N switching endpoints are different switching endpoints that belong to the virtual local area network, and a fifth sending unit 1105 configured to send a first response in response to the address acquisition request to the first switching endpoint, where the first response includes the address list, and the first response is used to instruct the first switching endpoint to send, in a unicast manner, the address acquisition request separately to the N switching endpoints that include the second switching endpoint such that the first switching endpoint can receive a second response that is sent by the second switching endpoint and includes the physical address of the second virtual machine, and such that the first switching endpoint sends the received second response to the first virtual machine.

The centralized controller 1100 provided in this embodiment of the present disclosure may further include a second judging unit 1103 configured to determine whether the physical address of the second virtual machine is stored in the centralized controller 1100, and a third determining unit 1104 configured to determine that the physical address of the second virtual machine is not stored in the centralized controller 1100, and trigger the fifth sending unit 1105 to send the first response in response to the address acquisition request to the first switching endpoint.

The centralized controller 1100 provided in this embodiment of the present disclosure may further include a storing unit 1106 configured to acquire a correspondence between the physical address of the second virtual machine and the IP address of the second virtual machine, and store the correspondence.

In this embodiment, before the fifth sending unit 1105 sends the first response to the first switching endpoint, the second judging unit 1103 may first determine whether the physical address of the second virtual machine is stored in the centralized controller. If the third determining unit 1104 determines that the physical address of the second virtual machine is not stored, the fifth sending unit 1105 sends the first response that includes the address list to the first switching endpoint such that the first virtual machine acquires the physical address of the second virtual machine. The storing unit 1106 may further store the correspondence between the physical address of the second virtual machine and the IP address of the second virtual machine after acquiring the physical address of the second virtual machine.

For ease of understanding, interaction between units in a centralized controller in an embodiment of the present disclosure is detailed below using a specific application scenario.

In a virtual local area network N, a centralized controller 1100 may manage multiple switching endpoints, where the switching endpoints may be physical switches, or may be virtual tunnel endpoint devices. For example, a switching endpoint a, a switching endpoint b, and a switching endpoint c exist. The switching endpoint a manages multiple virtual machines such as a virtual machine 1 and a virtual machine 2. The switching endpoint c also manages multiple virtual machines such as a virtual machine 3 and a virtual machine 4. The switching endpoint a and the virtual machine 1 and the virtual machine 2 managed by the switching endpoint a form a virtual local area subnet in the virtual local area network N, and the switching endpoint c and the virtual machine 3 and the virtual machine 4 form another virtual local area subnet in the virtual local area network N. When the virtual machine 1 wants to acquire a MAC address of the virtual machine 3, a fourth receiving unit 1101 receives an ARP address acquisition request sent by the switching endpoint a. The ARP address acquisition request is sent by the virtual machine 1 to the switching endpoint a in a broadcast manner. The ARP address acquisition request carries an IP address of the virtual machine 3. For example, the IP address is 192.168.1.1. The ARP address acquisition request further includes an identifier of the local area network N. For example, the identifier is VLAN. After receiving the ARP address acquisition request, the fourth receiving unit 1101 may acquire the identifier VLAN of the virtual local area network and the IP address 192.168.1.1 of the virtual machine 3 from the ARP address acquisition request. According to the identifier VLAN and the IP address 192.168.1.1 of the virtual machine 3, a second determining unit 1102. A second judging unit 1103 determines whether the MAC address of the virtual machine 3 is stored in a correspondence table of an IP address and a MAC address of the centralized controller 1100, and if a third determining unit 1104 determines that the MAC address of the virtual machine 3 is not stored, a fifth sending unit 1105 uses the first response to include the address list that includes the addresses of the switching endpoint b and the switching endpoint c, and sends the first response to the switching endpoint a. For example, the address list is: an IP address of the switching endpoint b is 51.169.1.3, and an IP address of the switching endpoint c is 51.169.1.4. The first response further instructs the switching endpoint a to send the tunnel-encapsulated ARP address acquisition request to the switching endpoint b and the switching endpoint c according to the address list, where the address list is: an IP address of the switching endpoint b is 51.169.1.3, and an IP address of the switching endpoint c is 51.169.1.4. The instruction further causes the switching endpoint a to send a second response to the virtual machine 1 after receiving the second response that is sent by the switching endpoint c and includes the MAC address 00-23-5A-15-99-42 of the virtual machine 3. In this way, the virtual machine 1 may acquire the MAC address 00-23-5A-15-99-42 of the virtual machine 3. The centralized controller 1100 may acquire a correspondence between the IP address 192.168.1.1 and the MAC address 00-23-5A-15-99-42 of the virtual machine 3 from the switching endpoint a or the switching endpoint c. A storing unit 1106 stores the correspondence such that another switching endpoint in the virtual local area network N may acquire the MAC address of the virtual machine 3 directly from the centralized controller when needing to request the MAC address of the virtual machine 3.

Figure 12:
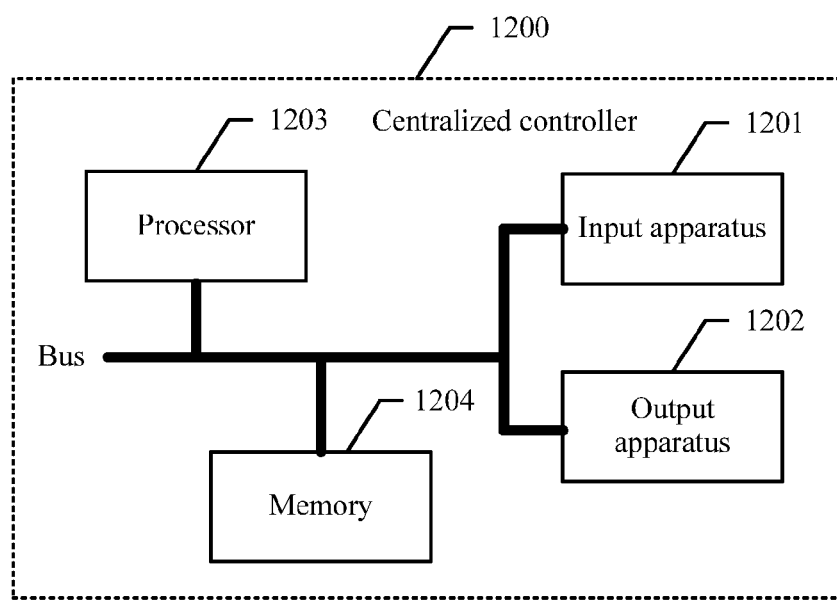
FIG. 12 is a schematic structural diagram of another embodiment of a centralized controller according to an embodiment of the present disclosure.

The foregoing describes the centralized controller in the embodiment of the present disclosure from a perspective of a modular function entity, and the following describes a centralized controller in an embodiment of the present disclosure from a perspective of hardware processing. Referring to FIG. 12, another embodiment of a centralized controller 1200 according to an embodiment of the present disclosure includes an input apparatus 1201, an output apparatus 1202, a processor 1203, and a memory 1204 (a quantity of processors 1203 in a centralized controller 1200 may be one or more, and FIG. 12 uses one processor 1203 as an example). In some embodiments of the present disclosure, the input apparatus 1201, the output apparatus 1202, the processor 1203, and the memory 1204 may be connected using a bus or by other means, and FIG. 12 uses a bus connection as an example, where by invoking an operation instruction stored in the memory 1204, the processor 1203 is used for a first virtual machine to acquire a physical address of a second virtual machine, where the first virtual machine and the second virtual machine belong to a same virtual local area network and do not belong to a same virtual local area subnet, and the processor 1203 is configured to perform the steps of receiving an address acquisition request sent by a first switching endpoint to which the first virtual machine belongs, determining, according to an identifier of a virtual local area network, an address list of N switching endpoints that include a second switching endpoint, and sending a first response in response to the address acquisition request to the first switching endpoint.

In this embodiment of the present disclosure, the processor 1203 further performs the step of determining whether the physical address of the second virtual machine is stored in the network device 1200, and if no, performing a step of sending, by a centralized controller, a first response in response to the address acquisition request to the first switching endpoint.

In this embodiment of the present disclosure, the processor 1203 further performs the step of acquiring a correspondence between the physical address of the second virtual machine and an IP address of the second virtual machine, and storing the correspondence.

Figure 13:
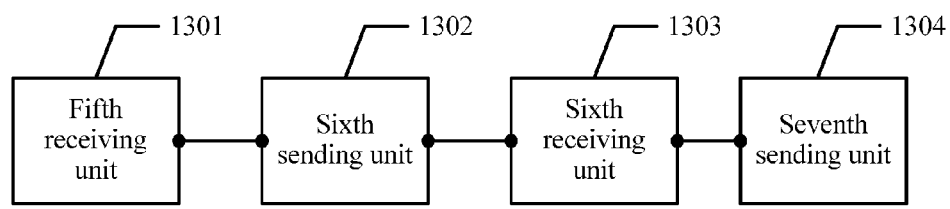
FIG. 13 is a schematic structural diagram of an embodiment of a second switching endpoint according to an embodiment of the present disclosure.

The foregoing describes the first switching endpoint and the centralized controller in the embodiments of the present disclosure separately, and the following describes a second switching endpoint in an embodiment of the present disclosure. Refer to FIG. 13, which is a schematic structural diagram of an embodiment of a second switching endpoint according to an embodiment of the present disclosure. As shown in FIG. 13, the second switching endpoint provided in this embodiment of the present disclosure may include a fifth receiving unit 1301 configured to receive an address acquisition request sent by a first switching endpoint in a unicast manner, where the address acquisition request is sent by a first virtual machine to the first switching endpoint, the address acquisition request is used to request to acquire a physical address of a second virtual machine, the first switching endpoint and the first virtual machine are located in a same virtual local area subnet, the second switching endpoint and the second virtual machine are located in a same virtual local area subnet, and the second virtual machine and the first virtual machine are located in a same virtual local area network and belong to different virtual local area subnets, a sixth sending unit 1302 configured to send the address acquisition request to the second virtual machine, a sixth receiving unit 1303 configured to receive a second response sent by the second virtual machine, where the second response includes the physical address of the second virtual machine, and a seventh sending unit 1304 configured to send the second response such that the second response is received by the first switching endpoint and sent by the first switching endpoint to the first virtual machine.

Figure 14:
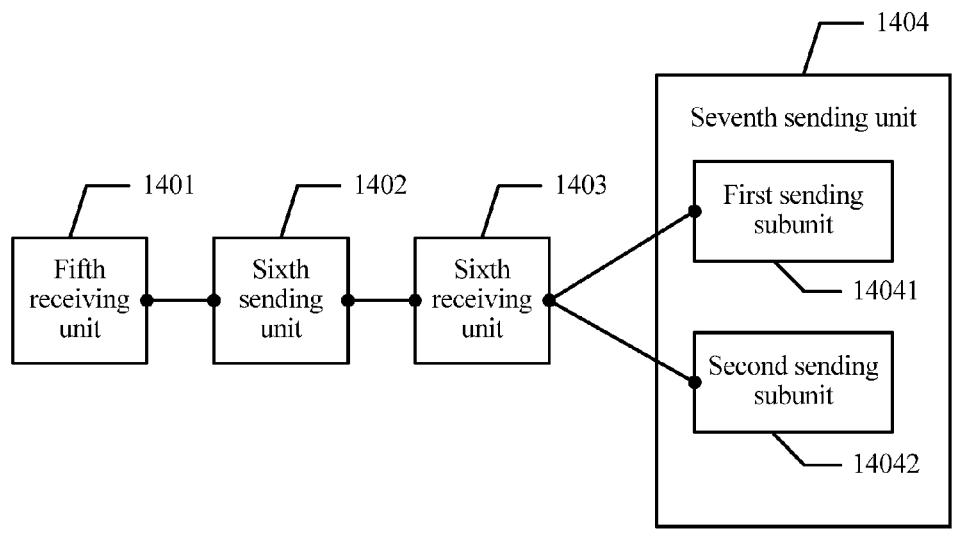
FIG. 14 is a schematic structural diagram of another embodiment of a second switching endpoint according to an embodiment of the present disclosure.

In this embodiment, after the fifth receiving unit 1301 receives the address acquisition request sent by the first switching endpoint in the unicast manner, the sixth sending unit 1302 sends the address acquisition request to the second virtual machine. After the sixth receiving unit 1303 receives the second response that is sent by the second virtual machine and includes the physical address of the second virtual machine, the seventh sending unit 1304 sends the second response such that the first switching endpoint receives the response, and such that the first switching endpoint sends the second response to the first virtual machine. In this way, the first virtual machine may acquire the physical address of the second virtual machine from the second response. In practical application, the second switching endpoint may further include another unit configured to send the second response such that the first switching endpoint receives the second response, which is detailed below using a specific embodiment. Referring to FIG. 14, FIG. 14 is a schematic structural diagram of an embodiment of a second switching endpoint according to an embodiment of the present disclosure. As shown in FIG. 14, the second switching endpoint provided in this embodiment of the present disclosure may include a fifth receiving unit 1401 configured to receive an address acquisition request sent by a first switching endpoint in a unicast manner, where the address acquisition request is sent by a first virtual machine to the first switching endpoint, the address acquisition request is used to request to acquire a physical address of a second virtual machine, the first switching endpoint and the first virtual machine are located in a same virtual local area subnet, the second switching endpoint and the second virtual machine are located in a same virtual local area subnet, and the second virtual machine and the first virtual machine are located in a same virtual local area network and belong to different virtual local area subnets, a sixth sending unit 1402 configured to send the address acquisition request to the second virtual machine, a sixth receiving unit 1403 configured to receive a second response sent by the second virtual machine, where the second response includes the physical address of the second virtual machine, and a seventh sending unit 1404 configured to send the second response such that the second response is received by the first switching endpoint and sent by the first switching endpoint to the first virtual machine.

In this embodiment of the present disclosure, the seventh sending unit 1404 may further include a first sending subunit 14041 configured to send the second response to the first switching endpoint, and a second sending subunit 14042 configured to send the second response to a centralized controller in the virtual local area network such that the centralized controller sends the second response to the first switching endpoint, and such that the centralized controller acquires a correspondence between the physical address of the second virtual machine and an IP address of the second virtual machine and stores the correspondence.

It should be noted that the seventh sending unit 1404 includes at least either of the first sending subunit 14041 and the second sending subunit 14042.

In this embodiment, after receiving the second response, the fifth receiving unit 1401 may use the first sending subunit 14041 or the second sending subunit 14042 to send the second response such that the first switching endpoint receives the second response that includes the physical address of the second virtual machine. In this way, the first virtual machine acquires the physical address of the second virtual machine.

For ease of understanding, interaction between units in a second switching endpoint in an embodiment of the present disclosure is detailed below using a specific application scenario.

In a virtual local area network N, a centralized controller A may manage multiple switching endpoints, where the switching endpoints may be physical switches, or may be virtual tunnel endpoint devices. For example, a switching endpoint a, a switching endpoint b, and a switching endpoint c exist. The switching endpoint a manages multiple virtual machines such as a virtual machine 1 and a virtual machine 2. The switching endpoint c also manages multiple virtual machines such as a virtual machine 3 and a virtual machine 4. The switching endpoint a and the virtual machine 1 and the virtual machine 2 managed by the switching endpoint a form a virtual local area subnet in the virtual local area network N, and the switching endpoint c and the virtual machine 3 and the virtual machine 4 form another virtual local area subnet in the virtual local area network N. When the virtual machine 1 wants to acquire a MAC address of the virtual machine 3, a fifth receiving unit 1401 in the switching endpoint c receives an ARP address acquisition request sent by the switching endpoint a. The ARP address acquisition request is sent by the virtual machine 1 to the switching endpoint a in a broadcast manner. The ARP address acquisition request carries an IP address of the virtual machine 3. For example, the IP address is 192.168.1.1. The ARP address acquisition request further includes an identifier of the local area network N. For example, the identifier is VLAN. After receiving the ARP address acquisition request, the fifth receiving unit 1401 may perform tunnel decapsulation on the ARP address acquisition request according to a communications protocol of the virtual local area network N. Then, a sixth sending unit 1402 sends the decapsulated ARP address acquisition request to the virtual machine 3. After receiving the ARP address acquisition request, the virtual machine 3 sends a second response to a sixth receiving unit 1403. The second response includes the MAC address of the virtual machine 3. For example, the MAC address is 00-23-5A-15-99-42. After the sixth receiving unit 1403 receives the second response, a second sending subunit 14042 in a seventh sending unit 1404 may send the second response to the centralized controller A such that the centralized controller A receives the second response and forwards the second response to the switching endpoint a, and the switching endpoint a sends the second response to the virtual machine 1. In this way, the virtual machine 1 may acquire the MAC address 00-23-5A-15-99-42 of the virtual machine 3 from the second response. Sending, by the second sending subunit 14042, the second response to the centralized controller A further enables the centralized controller A to acquire a correspondence between the IP address 192.168.1.1 and the MAC address 00-23-5A-15-99-42 of the virtual machine 3 from the second response and store the correspondence. After the sixth receiving unit 1403 receives the second response, a first sending subunit 14041 may further send the second response directly to the switching endpoint a such that the switching endpoint a sends the second response to the virtual machine 1. In this way, the virtual machine 1 may acquire the MAC address 00-23-5A-15-99-42 of the virtual machine 3 from the second response.

Figure 15:
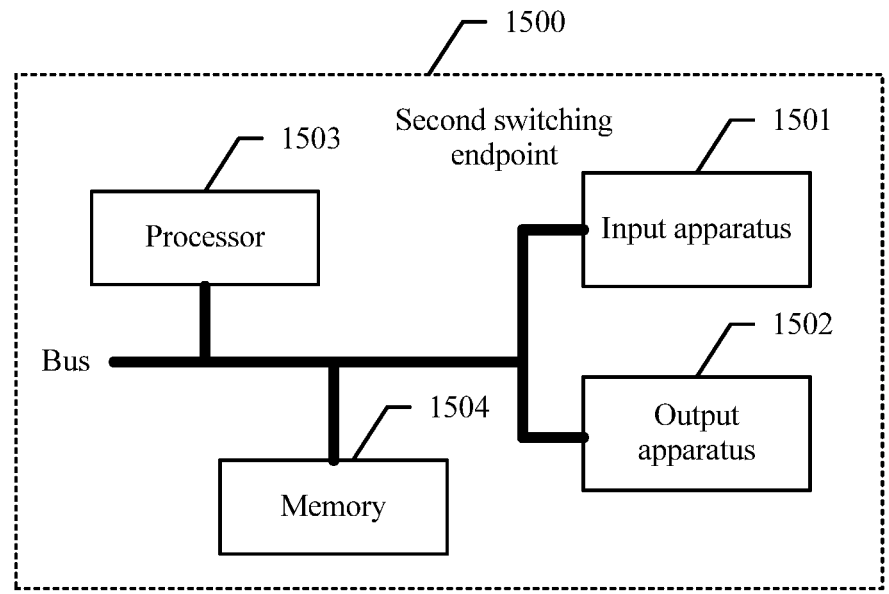
FIG. 15 is a schematic structural diagram of another embodiment of a second switching endpoint according to an embodiment of the present disclosure.

The foregoing describes the second switching endpoint in the embodiment of the present disclosure from a perspective of a modular function entity, and the following describes a second switching endpoint in an embodiment of the present disclosure from a perspective of hardware processing. Referring to FIG. 15, another embodiment of a second switching endpoint 1500 according to an embodiment of the present disclosure includes an input apparatus 1501, an output apparatus 1502, a processor 1503, and a memory 1504 (a quantity of processors 1503 in a second switching endpoint 1500 may be one or more, and FIG. 15 uses one processor 1503 as an example). In some embodiments of the present disclosure, the input apparatus 1501, the output apparatus 1502, the processor 1503, and the memory 1504 may be connected using a bus or by other means, and FIG. 15 uses a bus connection as an example, where by invoking an operation instruction stored in the memory 1504, the processor 1503 is configured to perform the steps of receiving an address acquisition request sent by a first switching endpoint in a unicast manner, sending the address acquisition request to a second virtual machine, receiving a second response sent by the second virtual machine, and sending the second response such that the second response is received by the first switching endpoint and sent by the first switching endpoint to a first virtual machine.

In this embodiment of the present disclosure, the processor 1503 is further configured to perform the steps of sending the second response to the first switching endpoint, and/or, sending the second response to a centralized controller of a virtual local area network such that the centralized controller sends the second response to the first switching endpoint, and such that the centralized controller acquires a correspondence between a physical address of the second virtual machine and an IP address of the second virtual machine and stores the correspondence.

Figure 16:
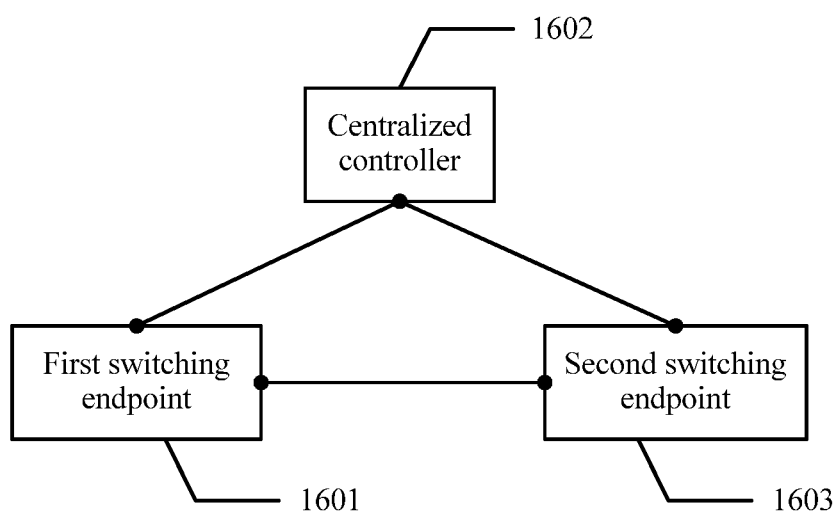
FIG. 16 is a schematic structural diagram of an embodiment of a communications system according to an embodiment of the present disclosure.

FIG. 15 above describes the second switching endpoint in the embodiment of the present disclosure, and the following describes a system in an embodiment of the present disclosure. Referring to FIG. 16, FIG. 16 is a schematic structural diagram of an embodiment of a communications system according to an embodiment of the present disclosure. As shown in FIG. 16, the communications system provided in this embodiment of the present disclosure may include a first switching endpoint 1601, a centralized controller 1602, and a second switching endpoint 1603, where the first switching endpoint 1601 is configured to receive an address acquisition request sent by a first virtual machine, where the address acquisition request carries an IP address of a second virtual machine and is used to request a physical address of the second virtual machine, and send the address acquisition request to a centralized controller 1602 of a virtual local area network, where the address acquisition request carries an identifier of the virtual local area network in which the first virtual machine is located. The centralized controller 1602 is configured to receive the address acquisition request sent by the first switching endpoint 1601, determine, according to the identifier of the virtual local area network, an address list of N switching endpoints that include the second switching endpoint 1603, and send a first response in response to the address acquisition request to the first switching endpoint 1601. The first switching endpoint 1601 is further configured to receive the first response, where the first response includes the address list of the N switching endpoints that include the second switching endpoint 1603, N is a positive integer, and the N switching endpoints are switching endpoints that belong to the virtual local area network, and send, in a unicast manner according to the first response, the address acquisition request separately to the N switching endpoints that comprise the second switching endpoint 1603. The second switching endpoint 1603 is configured to receive the address acquisition request sent by the first switching endpoint 1601 in the unicast manner, send the address acquisition request to the second virtual machine, receive a second response sent by the second virtual machine, and send the second response, and the first switching endpoint 1601 is further configured to receive the second response, where the second response includes the physical address of the second virtual machine, and send the second response to the first virtual machine.

The first switching endpoint 1601 and the first virtual machine are located in a same virtual local area subnet, the second switching endpoint 1603 and the second virtual machine are located in a same virtual local area subnet, and the first virtual machine and the second virtual machine are located in a same virtual local area network and belong to different virtual local area subnets.

In this embodiment, after receiving the address acquisition request sent by the first virtual machine, the first switching endpoint 1601 sends the address acquisition request to the centralized controller 1602. The centralized controller 1602 receives the address acquisition request, determines, according to the identifier of the virtual local area network, the address list of the N switching endpoints that include the second switching endpoint 1603, and sends the first response in response to the address acquisition request to the first switching endpoint 1601, where the first response includes the address list. The first switching endpoint 1601 receives the first response, and sends, in the unicast manner according to the address list, the address acquisition request to the N switching endpoints that include the second switching endpoint 1603. The second switching endpoint 1603 receives the address acquisition request, and sends the address acquisition request to the second virtual machine. The second switching endpoint 1603 receives the second response that is sent by the second virtual machine and includes the physical address of the second virtual machine, and sends the second response such that the first switching endpoint 1601 receives the second response. The first switching endpoint 1601 sends the received second response to the first virtual machine such that the first virtual machine may acquire the physical address of the second virtual machine.

For ease of understanding, interaction between apparatuses in a communications system in an embodiment of the present disclosure is detailed below using a specific application scenario.

In a virtual local area network N, a centralized controller 1602 may manage multiple switching endpoints, where the switching endpoints may be physical switches, or may be virtual tunnel endpoint devices. For example, a switching endpoint 1601, a switching endpoint b, and a switching endpoint 1603 exist. The switching endpoint 1601 manages multiple virtual machines such as a virtual machine 1 and a virtual machine 2. The switching endpoint 1603 also manages multiple virtual machines such as a virtual machine 3 and a virtual machine 4. The switching endpoint 1601 and the virtual machine 1 and the virtual machine 2 managed by the switching endpoint 1601 form a virtual local area subnet in the virtual local area network N, and the switching endpoint 1603 and the virtual machine 3 and the virtual machine 4 form another virtual local area subnet in the virtual local area network N. When the virtual machine 1 needs to acquire a MAC address of the virtual machine 3, the virtual machine 1 sends an ARP address acquisition request to the switching endpoint 1601 in a broadcast manner. The ARP address acquisition request carries an IP address of the virtual machine 3. For example, the IP address is 192.168.1.1. After receiving the ARP address acquisition request, the switching endpoint 1601 forwards the ARP address acquisition request to the centralized controller 1602 in the virtual local area network N. When forwarding the ARP address acquisition request to the centralized controller 1602, the switching endpoint 1601 may further attach an identifier of the virtual local area network N to the ARP address acquisition request. For example, the identifier is VLAN. After receiving the ARP request, the centralized controller 1602 may acquire the identifier VLAN of the virtual local area network and the IP address 192.168.1.1 of the virtual machine 3 from the ARP address acquisition request. According to the identifier VLAN and the IP address 192.168.1.1 of the virtual machine 3, the centralized controller 1602 determines whether the MAC address of the virtual machine 3 is stored in a correspondence table of an IP address and a MAC address of the centralized controller 1602. If the MAC address of the virtual machine 3 is stored, for example, the MAC address is 00-23-5A-15-99-42, the centralized controller 1602 sends the MAC address to the switching endpoint 1601 such that the switching endpoint 1601 sends the MAC address to the virtual machine 1. In this way, the virtual machine 1 may acquire the MAC address 00-23-5A-15-99-42 of the virtual machine 3. If the MAC address of the virtual machine 3 is not stored in the centralized controller 1602, the centralized controller 1602 uses a first response to include an address list that includes addresses of the switching endpoint b and the switching endpoint 1603, and sends the first response to the switching endpoint 1601. For example, the address list is: an IP address of the switching endpoint b is 51.169.1.3, and an IP address of the switching endpoint 1603 is 51.169.1.4. After receiving the first response, the switching endpoint 1601 may perform tunnel encapsulation on the first response according to a communications protocol of the virtual local area network N. According to the acquired address list, the switching endpoint 1601 sends the first response to the switching endpoint b and the switching endpoint 1603 in a unicast manner. The switching endpoint 1603 receives the first response, performs tunnel decapsulation on the first response, and then sends the tunnel-decapsulated first response to the virtual machine 3. After receiving the first response, the virtual machine 3 sends a second response in response to the ARP address acquisition request to the switching endpoint 1603, where the second response includes the MAC address 00-23-5A-15-99-42 of the virtual machine 3. After receiving the second response, the switching endpoint 1603 may perform tunnel encapsulation on the second response, and send the tunnel-encapsulated second response to the switching endpoint 1601. The switching endpoint 1601 receives the second response and performs tunnel decapsulation on the second response. The switching endpoint 1601 sends the tunnel-decapsulated second response to the virtual machine 1 such that the virtual machine 1 may acquire the MAC address 00-23-5A-15-99-42 of the virtual machine 3 from the second response. The switching endpoint 1601 may also send a correspondence between the MAC address 00-23-5A-15-99-42 of the virtual machine 3 and the IP address 192.168.1.1 of the virtual machine 3 to the centralized controller 1602. After receiving the second response, the switching endpoint 1603 may also send the second response to the centralized controller 1602. After receiving the second response, the centralized controller 1602 sends the second response to the switching endpoint 1601, acquires the correspondence between the MAC address 00-23-5A-15-99-42 of the virtual machine 3 and the IP address 192.168.1.1 of the virtual machine 3, and stores the correspondence. The centralized controller 1602 may further set an aging time of the correspondence to perform updating, for example, perform updating every five minutes. The switching endpoint 1601 receives the second response forwarded by the centralized controller 1602, and sends the second response to the virtual machine 1 such that the virtual machine 1 acquires the MAC address 00-23-5A-15-99-42 of the virtual machine 3.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for acquiring a physical address of a virtual machine, wherein the method is used for a first virtual machine to acquire a physical address of a second virtual machine and comprises:
   receiving, by a first switching endpoint to which the first virtual machine belongs, an address acquisition request sent by the first virtual machine, wherein the address acquisition request comprises an Internet Protocol (IP) address of the second virtual machine;
   sending, by the first switching endpoint, the address acquisition request to a centralized controller of a virtual local area network, wherein the address acquisition request carries an identifier of the virtual local area network in which the first virtual machine is located;
   receiving, by the first switching endpoint, a first response sent by the centralized controller in response to the address acquisition request, wherein the first response comprises an address list of N switching endpoints that comprise a second switching endpoint, wherein N is a positive integer, and wherein the N switching endpoints are switching endpoints that belong to the virtual local area network;
   sending, by the first switching endpoint in a unicast manner according to the first response, the address acquisition request separately to the N switching endpoints that comprise the second switching endpoint;
   receiving, by the first switching endpoint, a second response in response to the address acquisition request, wherein the second response is sent by the second switching endpoint to which the second virtual machine belongs, and wherein the second response comprises the physical address of the second virtual machine; and
   sending, by the first switching endpoint, the second response to the first virtual machine.

2. The method according to claim 1, wherein after the first switching endpoint receives the first response sent by the centralized controller in response to the address acquisition request, the method further comprises determining, that the first response indicates that the physical address of the second virtual machine is not stored in the centralized controller.

3. The method according to claim 1, wherein receiving, by the first switching endpoint, the second response in response to the address acquisition request further comprises receiving, by the first switching endpoint, the second response from the second switching endpoint.

4. The method according to claim 1, further comprising sending, by the first switching endpoint, a correspondence between the physical address and the IP address of the second virtual machine to the centralized controller such that the centralized controller stores the correspondence.

5. A method for acquiring a physical address of a virtual machine, wherein the method is used for a first virtual machine to acquire a physical address of a second virtual machine and comprises:
   receiving, by a centralized controller of a virtual local area network, an address acquisition request sent by a first switching endpoint to which the first virtual machine belongs, wherein the address acquisition request is sent by the first virtual machine in a broadcast manner, wherein the address acquisition request is used to request to acquire the physical address of the second virtual machine, and wherein the address acquisition request carries an Internet Protocol (IP) address of the second virtual machine and an identifier of the virtual local area network in which the first virtual machine is located;
   determining, by the centralized controller according to the identifier of the virtual local area network, an address list of N switching endpoints that comprise a second switching endpoint, wherein N is a positive integer, and wherein the N switching endpoints are switching endpoints that belong to the virtual local area network; and
   sending, by the centralized controller, a first response in response to the address acquisition request to the first switching endpoint, wherein the first response comprises the address list, and wherein the first response is used to instruct the first switching endpoint to send, in a unicast manner, the address acquisition request separately to the N switching endpoints that comprise the second switching endpoint.

6. The method according to claim 5, wherein before sending, by the centralized controller, the first response in response to the address acquisition request to the first switching endpoint, the method further comprises:
   determining, by the centralized controller, whether the physical address of the second virtual machine is stored in the centralized controller; and
   sending, by the centralized controller, the first response in response to the address acquisition request to the first switching endpoint when the physical address of the second virtual machine is stored in the centralized controller.

7. The method according to claim 5, further comprising:
   acquiring, by the centralized controller, a correspondence between the physical address of the second virtual machine and the IP address of the second virtual machine; and
   storing the correspondence.

8. A switching endpoint for enabling a first virtual machine to acquire a physical address of a second virtual machine, comprising:
   a processor; and
   a memory coupled to the processor and configured to store a plurality of instructions such that when executed by the processor, the instructions cause the processor to:
      receive an address acquisition request sent by the first virtual machine, wherein the address acquisition request carries an Internet Protocol (IP) address of the second virtual machine;
      send the address acquisition request to a centralized controller of a virtual local area network;
      receive a first response sent by the centralized controller in response to the address acquisition request, wherein the first response comprises an address list of N switching endpoints that comprise a second switching endpoint, wherein N is a positive integer, and wherein the N switching endpoints are switching endpoints that belong to the virtual local area network;

send, in a unicast manner according to the first response, the address acquisition request separately to the N switching endpoints that comprise the second switching endpoint;

receive a second response in response to the address acquisition request, wherein the second response is sent by the second switching endpoint to which the second virtual machine belongs, and wherein the second response comprises the physical address of the second virtual machine; and send the second response to the first virtual machine.

9. The switching endpoint according to claim 8, wherein the instructions further cause the processor to determine that the first response indicates the physical address of the second virtual machine is not stored in the centralized controller.

10. The switching endpoint according to claim 8, wherein the instructions further cause the processor to receive the second response from the second switching endpoint.

11. The switching endpoint according to claim 8, wherein the instructions further cause the processor to send a correspondence between the physical address and the IP address of the second virtual machine to the centralized controller such that the centralized controller stores the correspondence.

12. A centralized controller, comprising:
a processor; and
a memory coupled to the processor, and configured to store a plurality of instructions such that when executed by the processor, causes the processor to:
receive an address acquisition request sent by a first switching endpoint to which a first virtual machine belongs, wherein the address acquisition request is sent by the first virtual machine in a broadcast manner, wherein the address acquisition request is used to request a physical address of a second virtual machine, and wherein the address acquisition request carries an Internet Protocol (IP) address of the second virtual machine and an identifier of a virtual local area network in which the first virtual machine is located;

determine, according to the identifier of the virtual local area network, an address list of N switching endpoints that comprise a second switching endpoint, wherein N is a positive integer, and wherein the N switching endpoints are switching endpoints that belong to the virtual local area network; and send a first response in response to the address acquisition request to the first switching endpoint, wherein the first response comprises the address list, and wherein the first response is used to instruct the first switching endpoint to send, in a unicast manner, the address acquisition request separately to the N switching endpoints that comprise the second switching endpoint such that the first switching endpoint can receive a second response that is sent by the second switching endpoint and comprises the physical address of the second virtual machine, and such that the first switching endpoint sends the received second response to the first virtual machine.

13. The centralized controller according to claim 12, wherein the instructions further cause the processor to:
determine whether the physical address of the second virtual machine is stored in the centralized controller;
determine that the physical address of the second virtual machine is not stored in the centralized controller; and
send the first response in response to the address acquisition request to the first switching endpoint.

14. The centralized controller according to claim 12, wherein the instructions further cause the processor to:
acquire a correspondence between the physical address of the second virtual machine and the IP address of the second virtual machine; and
store the correspondence.

* * * * *